US012763798B2

(12) United States Patent
Rofougaran et al.

(10) Patent No.: US 12,763,798 B2
(45) Date of Patent: Oct. 13, 2026

(54) SYSTEM AND METHOD FOR TELEMETRY INFORMATION-BASED SIGNAL INTERFERENCE MITIGATION IN WIRELESS BACKHAUL MESH NETWORK

(71) Applicant: PELTBEAM INC., Sherman Oaks, CA (US)

(72) Inventors: Ahmadreza Rofougaran, Newport Beach, CA (US); Mehdi Hatamian, Mission Viejo, CA (US); Shervin Alireza Odabaee, Newport Coast, CA (US); Arman Rofougaran, Newport Coast, CA (US); Milan Rofougaran, Newport Coast, CA (US); Kavian Odabaee, Newport Coast, CA (US)

(73) Assignee: Peltbeams Inc., Sherman Oaks, CA (US)

( * ) Notice: Subject to any disclaimer, the term of this patent is extended or adjusted under 35 U.S.C. 154(b) by 0 days.

(21) Appl. No.: 19/383,442

(22) Filed: Nov. 7, 2025

(65) Prior Publication Data

US 2026/0081623 A1 Mar. 19, 2026

Related U.S. Application Data

(63) Continuation of application No. 19/276,080, filed on Jul. 22, 2025, now Pat. No. 12,500,611, which is a
(Continued)

(51) Int. Cl.
*H04B 1/00* (2006.01)
*H04B 7/155* (2006.01)
*H04W 84/18* (2009.01)

(52) U.S. Cl.
CPC ....... *H04B 1/0007* (2013.01); *H04B 7/15585* (2013.01); *H04W 84/18* (2013.01)

(58) Field of Classification Search
CPC .. H04B 1/0007; H04B 7/15585; H04W 84/18
See application file for complete search history.

(56) References Cited

U.S. PATENT DOCUMENTS 4,862,514 A 8/1989 Kedjierski
12,126,426 B1 10/2024 Rofougaran et al.
(Continued)

OTHER PUBLICATIONS

Non-Final Office Action for U.S. Appl. No. 19/055,573, dated Mar. 25, 2025.
(Continued)

*Primary Examiner* — Nader Bolourchi
(74) *Attorney, Agent, or Firm* — CHIP LAW GROUP

(57) ABSTRACT

A wireless communication system includes a central cloud server that causes a plurality of hybrid analog-digital repeater devices in a wireless backhaul mesh network to execute a first beam sweep in an azimuth plane in a defined step angle size covering 0° to 360° azimuth angular span, detects one or more first specific suspect directions of interferers by tuning the defined step angle size or the defined stop dwell time, cause the plurality of hybrid analog-digital repeater devices to execute a second beam sweep in an elevation plane in a defined step angle size spanning angles from −90° to +90° relative to an azimuth plane, and detects one or more second specific suspect directions of interferers by tuning the defined step angle size or the defined stop dwell time.

20 Claims, 12 Drawing Sheets

Related U.S. Application Data continuation of application No. 19/055,573, filed on Feb. 18, 2025, now Pat. No. 12,388,470, which is a continuation of application No. 18/884,140, filed on Sep. 13, 2024, now Pat. No. 12,261,634.

(56) References Cited

U.S. PATENT DOCUMENTS

| | | | | |
|---|---|---|---|---|
| 12,149,328 | B1 | 11/2024 | Rofougaran et al. | |
| 12,238,531 | B1 | 2/2025 | Rofougaran | |
| 12,261,634 | B1 * | 3/2025 | Rofougaran | H04B 1/0007 |

OTHER PUBLICATIONS

Notice of Allowance for U.S. Appl. No. 18/884,140, Nov. 18, 2024.
Notice of Allowance for U.S. Appl. No. 19/055,573, filed May 12, 2025.
Notice of Allowance for U.S. Appl. No. 19/276,080, filed Aug. 28, 2025.

* cited by examiner

SYSTEM AND METHOD FOR TELEMETRY INFORMATION-BASED SIGNAL INTERFERENCE MITIGATION IN WIRELESS BACKHAUL MESH NETWORK

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 19/276,080 filed on Jul. 22, 2025, which is a Continuation Application of U.S. Pat. No. 12,388,470 issued on Aug. 12, 2025, which is a Continuation Application of U.S. Pat. No. 12,261,634 issued on Mar. 25, 2025. Each of the above-referenced applications is hereby incorporated herein by reference in its entirety.

FIELD OF TECHNOLOGY

Certain embodiments of the disclosure relate to a wireless communication system in a wireless backhaul mesh network. More specifically, certain embodiments of the disclosure relate to a wireless communication system and a method for telemetry information-based signal interference detection and mitigation in wireless backhaul mesh network for high-performance and ultra-reliable communication.

BACKGROUND

Conventional communication devices, such as wireless access points (WAPs), are often used to extend the wireless coverage of an existing Wi-Fi signal to access the Internet and to increase the number of end-user devices capable of using Wi-Fi® may connect to the WAPs. However, Wi-Fi® signals, under the limitation of the Wi-Fi® communication protocol, have a defined range beyond which the connectivity is lost. Thus, many WAPs or range extenders are used if wireless coverage for Wi-Fi® signals is to be extended. Moreover, under ideal conditions, typically, 2.4 GHz Wi-Fi® supports up to 450 Mbps or 600 Mbps, and 5 GHz Wi-Fi® supports up to 1300 Mbps. Thus, the data transmission over such narrow bandwidth is much lower than higher radio frequencies.

The emergence of fifth generation (5G) technology standards for cellular networks has unleashed unprecedented possibilities across industries fueled by multi-gigabit speeds, massive capacity, and low latency. However, prohibitive infrastructure costs have challenged full-scale realization. Legacy wireless systems also face inconsistencies around throughput, resilience, and complexity. This necessitates carrier-grade wireless connectivity to deliver fiber-like consistency combined with agile, scalable deployment models. Furthermore, latency and signal noise are other technical problems with existing wireless communication systems and network architecture. Such latency increases when more wireless access points or relay nodes are introduced to extend the communication range.

Furthermore, radio frequency (RF) signals can interfere with each other and with other wireless technologies, such as Wi-Fi® and satellite communications. Buildings, trees, and other obstacles can block some RF signals, such as 5G signals, making it difficult to provide reliable coverage in dense urban environments. Traditional digital backhaul solutions are not well-suited to addressing these challenges.

Digital backhaul systems are complex and expensive to deploy and may be susceptible to interference and blockages.

Further limitations and disadvantages of conventional and traditional approaches will become apparent to one of skill in the art through comparison of such systems with some aspects of the present disclosure as set forth in the remainder of the present application with reference to the drawings.

BRIEF SUMMARY OF THE DISCLOSURE

A wireless communication system and a method for telemetry information-based signal interference detection and mitigation in wireless backhaul mesh network for high-performance and ultra-reliable communication, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
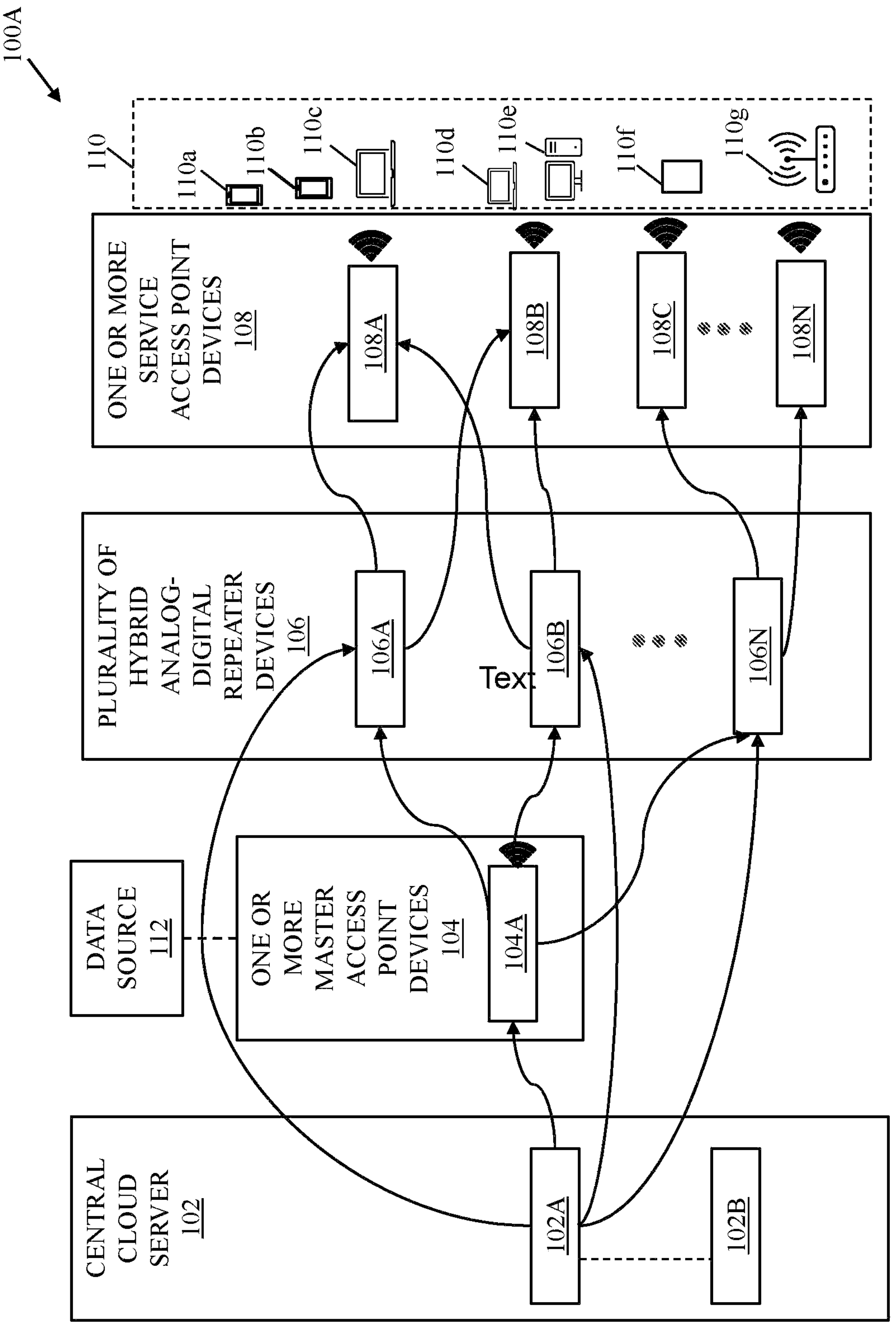
FIG. 1A is a diagram that illustrates an exemplary wireless communication system for telemetry information-based signal interference detection and mitigation in a wireless backhaul mesh network, in accordance with an exemplary embodiment of the disclosure.

Certain embodiments of the disclosure may be found in a wireless communication system and a method for telemetry information-based signal interference detection and mitigation in wireless backhaul mesh network for high-performance and ultra-reliable communication.

In conventional mesh network systems, RF signals can interfere with each other and with other wireless technologies, such as Wi-Fi® and satellite communications. Buildings, trees, and other obstacles may block some RF signals, for example, 5G signals, making it difficult to provide reliable coverage in dense urban environments. Traditional digital backhaul solutions are not well-suited to addressing these challenges. Digital backhaul systems are complex and expensive to deploy and may be susceptible to interference and blockages. Further, in urban settings and densely populated areas, the proliferation of Wi-Fi® networks may lead to overlapping signals, resulting in interference and network congestion. This challenge is particularly pronounced in apartments and residential complexes where multiple networks often operate in close proximity.

The disclosed wireless communication system includes a plurality of hybrid analog-digital repeater devices, which may be primarily analog repeater devices where the data propagation path in the wireless communication system is analog with some digital processing may be performed for external network control, for example, by the central cloud server, and thus may be referred to as hybrid analog-digital repeater devices. In contrast to the conventional mesh network systems, the wireless communication system and method of the present disclosure may cause the plurality of hybrid analog-digital repeater devices to form dual analog data links on a first type of polarization and a second type of polarization with one or more neighboring network nodes in the wireless backhaul mesh network to provide a robust solution in dense urban environments. By ensuring inherent redundancy and resilience, the system maintains uninterrupted communication between master wireless access point (WAP) device and one or more service WAP devices present in the wireless communication system, even when one link on one type of polarization faces excessive interference or blockage. Beneficially, levering different type of polarizations provides advantage over traditional digital backhaul solutions, which are not only complex and expensive to deploy but also susceptible to interference and blockages.

Furthermore, the wireless communication system may obtain a first type of telemetry information from the plurality of hybrid analog-digital repeater devices whereas a second type of telemetry information may be obtained from the master wireless access point (WAP) device and one or more service wireless access point devices in the wireless backhaul mesh network. Based on the first type of telemetry information and the second type of telemetry information, a radio frequency (RF) signal interference or blockage may be determined on the first type of polarization corresponding to a first analog data link of the dual analog data links at one or more hybrid analog-digital repeater devices of the plurality of hybrid analog-digital repeater devices. Further, the data traffic may be switched at the one or more hybrid analog-digital repeater devices on the second type of polarization corresponding to a second analog data link of the dual analog data links when the RF signal interference or blockage is determined on the first type of polarization corresponding to the first analog data link at the one or more hybrid analog-digital repeater devices. The central cloud server's intelligent network management capabilities, enabled by analyzing telemetry information from different types of network nodes allow the system to adapt to changing environmental conditions and maintain optimal performance. This is particularly useful in urban settings and densely populated areas, where the proliferation of Wi-Fi® networks can lead to overlapping signals, resulting in interference and network congestion. The ability to detect and mitigate interference and blockages efficiently, combined with the flexibility of hybrid analog-digital repeater devices acting as a bi-directional RF bridge, makes it an ideal solution for such challenging environments. Furthermore, the scalability and cost-effectiveness of the wireless backhaul mesh network with hybrid analog-digital repeater devices make it a compelling alternative to traditional digital backhaul systems, which are not well-suited to addressing the challenges faced in dense urban environments. By leveraging the first type of telemetry information and the second type of telemetry information, the central cloud server enables intelligent switching mechanism to optimize network performance and wireless backhaul optimization and resilience to accelerate 5G or 6G adoption.

In the following description, reference is made to the accompanying drawings, which form a part hereof, and in which are shown, by way of illustration, various embodiments of the present disclosure.

FIG. 1A is a diagram that illustrates an exemplary wireless communication system for telemetry information-based signal interference detection and mitigation in a wireless backhaul mesh network, in accordance with an exemplary embodiment of the disclosure. With reference to FIG. 1A, there is shown a wireless communication system 100A. The wireless communication system 100A may include a central cloud server 102, one or more master Wireless Access Point (WAP) devices 104, a plurality of hybrid analog-digital repeater devices 106, and one or more service WAP devices 108. There is further shown one or more user equipment (UEs) 110 (e.g., UEs 110*a* to 110*g*) and a data source 112. The central cloud server 102 may include one or more processors, such as the processor 102A, and a neural network model 102B. The one or more master WAP devices 104, the plurality of hybrid analog-digital repeater devices 106, and the one or more service WAP devices 108 may be collectively referred to as a plurality of network nodes of a wireless backhaul mesh network of the wireless communication system 100A.

The central cloud server 102 includes suitable logic, circuitry, and interfaces that may be configured to communicate with the one or more master WAP devices 104 and the plurality of hybrid analog-digital repeater devices 106. In an implementation, the central cloud server 102 may be communicatively coupled to each network node (e.g., communicatively coupled to the one or more service WAP devices 108 and the one or more UEs 110). In an example, the central cloud server 102 may be a remote management server that is managed by a third party different from the service providers associated with the plurality of different wireless carrier networks (WCNs). In another example, the central cloud server 102 may be a remote management server or a data center that is managed by a third party, or jointly managed, or managed in coordination and association with one or more of the plurality of different WCNs.

The processor 102A may be further configured to cause each network node of the wireless communication system 100A to determine location information of a plurality of neighboring nodes around each network node. Each network node may determine its geo-location and the geo-location of the neighboring nodes. In an implementation, each of the plurality of hybrid analog-digital repeater devices 106 may further comprise a position sensor (e.g., a gyroscope) or a location sensor (e.g., a global positioning system (GPS) sensor or other geospatial location sensor). In another implementation, each network node may further include Wi-Fi capability, which may be used, for example, to determine its location coordinates or location coordinates of neighboring nodes (e.g., nearby mesh nodes) by received signal strength indication (RSSI)-based triangulation or WI-FI®-based triangulation process, known in the art. Examples of the processor 102A of the central cloud server 102 may include but are not limited to a central processing unit (CPU), graphical processing unit (GPU), a Reduced Instruction Set Computing (RISC) processor, an Application-Specific Integrated Circuit (ASIC) processor, a Complex Instruction Set Computing (CISC) processor, and/or other processors, or state machines.

The neural network model 102B of the central cloud server 102 may be periodically (e.g., daily and for different times-of-day) trained on data points (e.g., different types of telemetry information) uploaded to the central cloud server 102 by each network node, such as the one or more master WAP devices 104, the plurality of hybrid analog-digital repeater devices 106, and the one or more service WAP devices 108.

The one or more master WAP devices 104 includes suitable logic, circuitry, and interfaces that may be configured to provide access to the Internet or wireless backhaul in 5G or 6G networks. Examples of the one or more master WAP devices 104 may include, but is not limited to a home gateway device, a 5G wireless access point, a wireless router, a fifth generation (5G) modem, a backplane system, an evolved-universal terrestrial radio access-new radio (NR) dual connectivity (EN-DC) device, an advanced router, a bridge router, a network controller, a fixed wireless access (FWA) device, a firewall device, or a network security device, or one or more combinations thereof.

The plurality of hybrid analog-digital repeater devices 106 may be disposed as a radio frequency (RF) bridge between the master WAP device 104A and the one or more service WAP devices 108 such that a data propagation path of user data relayed through a network of the plurality of hybrid analog-digital repeater devices 106 may be analog without any digital decoding or encoding of the user data in a RF signal to reduce latency less than a threshold time. For example, the data propagation path may comprise high-frequency analog circuitry to minimize latency to nanoseconds. Multi-hop relaying of intermediate frequency signals (e.g. mmWave signals) may happen without any digital encoding or decoding of the user data (i.e., payload). Further, a backchannel connectivity and control of the network of the plurality of hybrid analog-digital repeater devices 106 may be via a lower WLAN frequency (e.g., 2.4 GHz or 5 Ghz of Wi-Fi® 7 or 8), based on a signal metadata of the incoming RF signal. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture. The plurality of hybrid analog-digital repeater devices 106 extends the coverage area of the master WAP device 104A and one or more service WAP devices 108, allowing them to serve its corresponding UEs in areas that may have poor signal reception.

The one or more service WAP devices 108 may be configured to receive a beam of RF signals in the intermediate frequency band (e.g., mmWave frequency or intermediate frequency in range of 10-300 GHz) from the one or more second hybrid analog-digital repeater devices (e.g., the hybrid analog-digital repeater devices 106B to 106N) and convert back to the WLAN signal to serve one or more UEs 110 in a data throughput greater than a threshold throughput. Each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of intermediate frequencies (e.g., millimeter-wave frequencies) and Mu-MIMO together may provide high data rates and efficient use of the available spectrum.

Each of one or more UEs 110 may correspond to a wireless device, such as a client device or a telecommunication hardware used by an end-user to communicate. Some of the one or more UEs 110 may refer to a combination of a mobile equipment and subscriber identity module (SIM). Examples of the one or more UEs 110 may include, but are not limited to a smartphone, a laptop, a desktop machine, a customer premise equipment, a virtual reality headset, an augmented reality device, a wireless modem, a home router, a Wi-Fi® enabled smart television (TV) or set-top box, a VoIP station, or any other customized hardware for wireless communication.

In an implementation, the data source 112 of the master WAP device 104A may be one or more of an optical fiber port connected to an optical fiber for an Internet connection, an Ethernet port connected to an Ethernet cable for the Internet connection, or a 5G or 6G mmWave cellular signal received from a radio access network (RAN) node.

Currently, in WLAN technology, the 2.4 GHz and 5 GHz frequency bands are unlicensed spectrums that limited and congested and when running high-bandwidth applications, existing Wi-Fi networks inevitably encounter low quality of service (QoS). More advanced WLAN technology, like the IEEE 802.11be (Wi-Fi® 7) is being developed with higher data rate capability, such as theoretical capacity of up to 30 Gbps (e.g., assuming ideal conditions like clear line-of-sight, single user, and no interference) while 5-10 Gbps is a more realistic expectation in practical scenarios. There are many factors affecting practical capacity, such as signal interference from nearby devices, appliances, and even weather can disrupt signals, reducing throughput. In another example, distance from access point is also another factor where signal strength weakens with distance, impacting achievable speeds. In yet another example, sharing bandwidth among multiple users reduces individual speeds. One of the main objectives of Wi-Fi® 7 is to make full use of up to 1.2 GHz spectrum resources in the 6 GHz band. However, it is increasingly becoming evident that to effectively utilize these frequency resources, Wi-Fi® 7 or more advanced WLAN technologies may have to coexist with other different technologies operating in the same band, such as IEEE 802.11ax (or IEEE 802.11be) and 5G on the unlicensed band. Coexistence among wireless networks is challenging, especially when these networks are heterogeneous. Densely deployed sub-6 or 6-7.125 GHz WLANs alone may not provide the seamless connectivity required by mobile services and the rapid increase in mobile data traffic in future wireless networks. As a result, one of the main advancements in the network design for WLAN relies on integrating multiple different bands (e.g., microwave and mmWave). Wireless mesh networks (WMNs) are anticipated to resolve the limitations and to significantly improve the performance of ad hoc networks, wireless local area networks (WLANs), wireless personal area networks (WPANs), and wireless metropolitan area networks (WMANs). However, legacy wireless systems face inconsistencies around throughput, resilience, and complexity, where latency and signal noise are other technical problems with existing wireless communication systems and network architecture. Such latency increases when more wireless access points or relay nodes are introduced in the network to extend the communication range. Further, collision avoidance in wireless networks is a significant problem, especially with traditional wireless mesh networks and WLAN systems. Typically, collisions occur when multiple devices attempt to transmit data simultaneously on a shared wireless channel, resulting in corrupted data and reduced network performance.

In contrast to the conventional systems, in the present disclosure, the wireless communication system 100A intelligently balances the simplicity and low latency of analog signal relaying with the flexibility and intelligence of digital processing in a hybrid architecture. This hybrid approach allows to achieve not only the low latency and high efficiency of analog signal relaying but also the flexibility and programmability of digital signal processing. The wireless communication system 100A of the present disclosure not only improves data transfer rates between at least two communication devices as compared to existing wireless systems (e.g. conventional wireless local area networks (WLANs), Wi-Fi® systems, or traditional Wi-Fi® mesh networks) but also enables almost near zero latency communication with significantly reduced interference, almost zero-collision and an always-connected experience.

Beneficially, the central cloud server 102 may be configured to obtain different types of telemetry information from different types of devices. For example, a first type of telemetry information from the plurality of hybrid analog-digital repeater devices 106 and a second type of telemetry information from the wireless access point (WAP) devices, such as the master WAP device 104A and the one or more service WAP devices 108. Each of the plurality of hybrid analog-digital repeater devices 106 may include a set of onboard sensors, which may capture sensor data to enrich each analog hybrid analog-digital repeater device with environmental awareness for intelligent intra-node and inter-node optimizations. The second type of telemetry information may be different from the first type of telemetry information. The first type of telemetry information may be related to the state of the repeater devices themselves (i.e. performance of the plurality of hybrid analog-digital repeater devices 106), whereas the second type of telemetry information may be related to the performance metrics and characteristics of the end user devices connected to the WAP devices (the master WAP device 104A and the one or more service WAP devices 108 in the network, providing insights into the user experience. The central cloud server 102 may be further configured to form a wireless backhaul mesh network based on the first type of telemetry information and the second type of telemetry information, for example, to route traffic over the high-performance links maximizing capacity, range and resilience compared to rigid deployments. The wireless backhaul mesh network may refer to the communication infrastructure that interconnects the master WAP device 104A, the one or more service WAP devices 108, and the plurality of hybrid analog-digital repeater devices 106 using wireless links. The mesh configuration allows for redundant paths and flexible routing of data traffic between the master WAP device 104A and the one or more service WAP devices 108. The operations of the central cloud server 102 are described in detail with respect to interference detection and mitigation based on different types of telemetry information from different types of network nodes in a wireless backhaul mesh network for high-performance and ultra reliable communication, for example, in FIG. 5.

In accordance with an embodiment, the plurality of hybrid analog-digital repeater devices 106 may be disposed at a plurality of different locations. A first hybrid analog-digital repeater device (e.g., the hybrid analog-digital repeater device 106A) may be configured to receive a wireless local area network (WLAN) signal from the master WAP device 104A. The first hybrid analog-digital repeater device (e.g., the hybrid analog-digital repeater device 106A) may be configured to convert the WLAN signal to a first beam of radio frequency (RF) signal in an intermediate frequency band and may further relay the first beam of RF signals in the intermediate frequency band to one or more second hybrid analog-digital repeater devices (e.g., the hybrid analog-digital repeater devices 106B and 106N) of the plurality of hybrid analog-digital repeater devices 106 under the control of the central cloud server 102. The first hybrid analog-digital repeater device (e.g., the hybrid analog-digital repeater device 106A) may be also referred to as a root node that may interface the master WAP device 104A (i.e., the WAP source) and convert the first WLAN signal into intermediate frequency (IF, which may also be referred to as an Internal Frequency) for a beam mesh downstream. Each of the plurality of hybrid analog-digital repeater devices 106 may be equipped with amplifiers (e.g., power amplifiers) and phase shifters (not shown), which enhances the first WLAN signal received from the master WAP device 104A and relay it over longer distances.

The one or more service WAP devices 108 may be configured to receive the first beam of RF signals in the intermediate frequency band (e.g., mmWave frequency or intermediate frequency in the range of 10-300 GHz) from the one or more second hybrid analog-digital repeater devices (e.g., the hybrid analog-digital repeater devices 106B and 106N) and convert back to the WLAN signal to serve one or more UEs 110 in a data throughput greater than a threshold throughput. The use of plurality of hybrid analog-digital repeater devices 106 extends the coverage area of the master WAP device 104A and one or more service WAP devices 108, allowing them to serve their corresponding UEs in areas that may have poor signal reception or are located farther away from the master WAP device 104A.

In accordance with an embodiment, the plurality of hybrid analog-digital repeater devices 106 may be disposed as a bi-directional radio frequency (RF) bridge of data traffic between the master WAP device 104A and the one or more service WAP devices 108 such that a data propagation path of user data relayed through a network of the plurality of hybrid analog-digital repeater devices 106 may be analog without any digital decoding or encoding of the user data in the first beam of RF signals to reduce latency less than a threshold time. For example, the data propagation path may comprise high-frequency analog circuitry to minimize latency to nanoseconds. Multi-hop relaying of intermediate frequency signals (e.g., mmWave signals) may happen without any digital encoding or decoding of the user data (i.e., payload). Further, a backchannel connectivity and control of the network of the plurality of hybrid analog-digital repeater devices 106 may be via a second WLAN frequency, based on a signal metadata of the first beam of RF signal. The second WLAN frequency may be less than the first WLAN frequency. While the data propagation path may remain entirely analog for lowest latency, the plurality of hybrid analog-digital repeater devices 106 may extract the signal metadata from RF signals for analysis. This allows deriving wireless metrics like timing parameters, signal quality, interference levels, channel state information, and reference signals using digital signal processing (DSP) techniques. Thus, the simplicity and low latency of analog signal relaying is intelligently combined with the flexibility and intelligence of digital processing in a hybrid architecture.

In accordance with an embodiment, the plurality of hybrid analog-digital repeater devices 106 may serve as a RF communication bridge between the master WAP device 104A and one or more service WAP devices 108, which allows for the analog relay of user data through a network of the plurality of hybrid analog-digital repeater devices 106. The analog transmission of the user data reduces latency because there is no need for digital encoding and decoding processes, which can introduce delays. By transmitting user data (i.e., payload) in its original analog form, the wireless communication system 100A achieves faster transmission times, making it suitable for applications that require real-time communication, such as data streaming, video streaming, online gaming, and the like. Further, separating the data propagation path and control connectivity ensures that control signals do not interfere with the data transmission path. This separation is beneficial for maintaining the quality of service and preventing degradation of the data transmission path. Further, utilizing parallel channels for control and data connectivity allows for simultaneous communication of control signals and data packets. By operating these channels independently, the wireless communication system 100A prevents congestion and ensures that both control and data traffic receive sufficient bandwidth and priority. This parallel approach enhances network stability and reliability, particularly in environments with high data traffic. Furthermore, intermediate frequencies may be Millimeter-wave (mmWave) signals that operate at higher frequencies than traditional Wi-Fi signals, enabling faster data transfer rates and lower latency. By utilizing intermediate frequencies (e.g., mmWave frequencies or other intermediate frequencies in the range of 10-300 GHz) for analog data transmission between the master WAP device 104A and the one or more service WAP devices 108, the wireless communication system 100A achieves low-latency communication, say microseconds, making it ideal for applications that require rapid response times. Furthermore, lower frequency signals typically have better penetration and coverage, making them suitable for control and coordination purposes. By leveraging lower frequency WLAN signals (e.g., Wi-Fi® signals at 2.4 or 5 GHz) for backchannel communication, a reliable connectivity and coordination among the plurality of hybrid analog-digital repeater devices 106 may be provided. The second WLAN frequency may be in a range of 2.4-5 GHz. Alternatively stated, the intelligent combination of WLAN and mmWave signals enables hybrid coordination, leveraging the strengths of both technologies for optimized network performance. WLAN provides broader coverage and connectivity, while mmWave offers high-speed, low-latency communication. By synergistic integration of the plurality of hybrid analog-digital repeater devices 106 with the modified WAPs (the master WAP device 104A and the one or more service WAP devices 108), the wireless communication system 100A achieves responsive network-wide orchestration, enhancing overall network efficiency and responsiveness.

In accordance with an embodiment, the intermediate frequency band of the first beam of RF signals may be a mmWave frequency in a range of 24-300 GHz or other intermediate frequency in the range of 10-300 GHz. In accordance with an embodiment, the first WLAN frequency and the intermediate frequency band of the first beam of RF signals may be one of a licensed mmWave spectrum of a network operator or an unlicensed mmWave spectrum, or a combination thereof. In order to minimize interference, the wireless communication system 100A may be implemented as a wireless backhaul mesh network in the licensed mmWave band, where the communication channels may experience reduced interference as the network's resilience against potential disruptions is enhanced caused by interference from other networks. The exclusive use of dedicated frequencies allows for a more robust and interference-free communication infrastructure using a combination of WLAN frequencies and licensed mmWave frequencies contributing to improved network performance and quality of service.

In accordance with an embodiment, each of the master WAP device 104A and the one or more service WAP devices 108 may be configured to perform Multi-User, Multiple Input, Multiple Output (Mu-MIMO) to corresponding connected UEs via corresponding mmWave New Radio Unlicensed (NR-U) links. The use of millimeter-wave frequencies and Mu-MIMO together may provide high data rates and efficient use of the available spectrum. Millimeter-wave frequencies offer increased bandwidth, and Mu-MIMO enhances the overall network capacity by enabling simultaneous communication with multiple user devices. This may result in improved throughput and reduced latency, contributing to a more robust and high-performance wireless communication system, particularly in the context of 5G NR-U deployments.

Figure 1B:
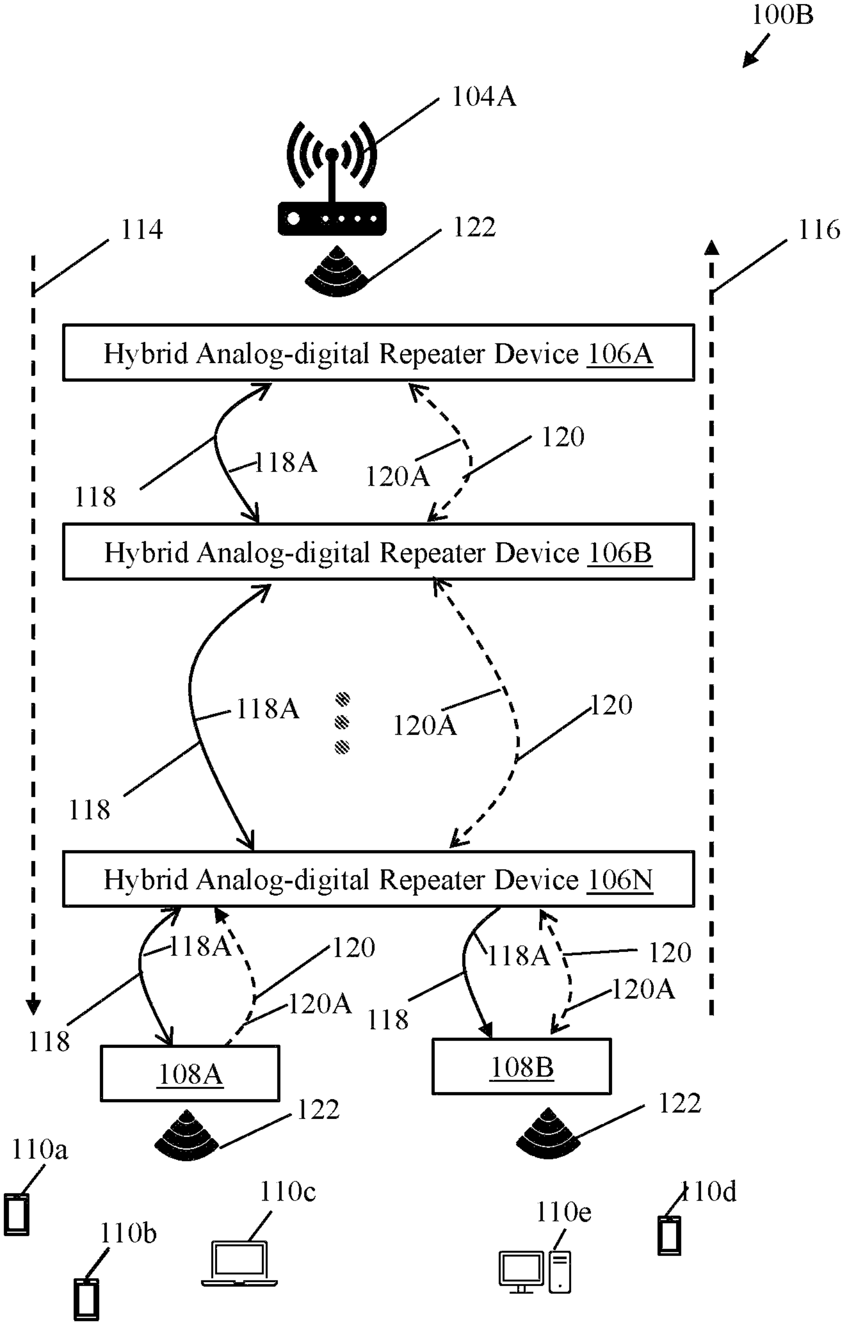
FIG. 1B is a diagram that illustrates an exemplary dual analog data links on a first type of polarization and a second type of polarization across a plurality of hybrid analog-digital repeater devices in a wireless communication system, in accordance with an exemplary embodiment of the disclosure.

FIG. 1B is a diagram that illustrates an exemplary dual analog data links on a first type of polarization and a second type of polarization across a plurality of hybrid analog-digital repeater devices in a wireless communication system, in accordance with an exemplary embodiment of the disclosure. FIG. 1B is explained in conjunction with elements from FIG. 1A. With reference to FIG. 1B, there is shown a network 100B of the plurality of hybrid analog-digital repeater devices 106, such as the hybrid analog-digital repeater devices 106A, 106B, and 106N.

In accordance with an embodiment, each of the plurality of hybrid analog-digital repeater devices 106 (e.g., the hybrid analog-digital repeater devices 106A, 106B, . . . , 106N) may be configured to form dual analog data links 118 and 120 on a first type of polarization 118A and a second type of polarization 120A with one or more neighboring network nodes in the wireless backhaul mesh network. When a hybrid analog-digital repeater device is deployed in the wireless backhaul mesh network, it establishes two separate analog data links with its neighboring nodes: one link using the first type of polarization (e.g., vertical polarization) and another link using the second type of polarization (e.g., horizontal polarization). The dual analog data links 118 and 120 may operate concurrently and independently. In an implementation, each of the plurality of hybrid analog-digital repeater devices 106 may perform receive (Rx) and transmit (Tx) operations on same type of polarization (e.g., the first type of polarization 118A) at different time slot using time division duplexing (TTD). TDD allows the repeater device to use the same polarization for both Rx and Tx operations by allocating different time slots for each operation. This means that the repeater device can receive data on a specific polarization during one time slot and transmit data on the same polarization during another time slot. Similarly, each of the plurality of hybrid analog-digital repeater devices 106 may perform receive (Rx) and transmit (Tx) operations on second type of polarization 120A at different time slot using TTD, thereby forming full duplex two concurrent bi-directional data paths using two different types of polarizations.

In an example, each of the plurality of hybrid analog-digital repeater devices 106 (e.g. the hybrid analog-digital repeater devices 106A, 106B, . . . , 106N) may transmit a first beam of RF signals carrying user data in an intermediate frequency band (e.g., mmWave frequency) in the first type of polarization 118A over a first analog data link 118 towards its neighboring repeater node, which then amplifies and relays the first beam of RF signals in the intermediate frequency (e.g., mmWave frequency) in the first type of polarization 118A in the downstream communication 114. Similarly, for the upstream communication 116, each of the plurality of hybrid analog-digital repeater devices 106 may be configured to transmit a second beam of RF signals carrying user data in the intermediate frequency band in the first type of polarization 118A over different time slot different towards its neighboring repeater node, which then amplifies and relays further the second beam of RF signal in the intermediate frequency band in the first type of polarization 118A in the upstream communication 116. The first type of polarization 118A may be different from the second type of polarization 120AAn example of the first and the second type of polarization may be a vertical polarization state and a horizontal polarization state. In vertical polarization, the electric field component of the electromagnetic wave (i.e., the mmWave signal) oscillates vertically, meaning it moves up and down concerning the Earth's surface. In horizontal polarization, the electric field component of the electromagnetic wave (i.e., the mmWave signal) oscillates horizontally, moving side to side parallel to the Earth's surface. The downstream communication 114 may refer one or more communication paths (e.g., one or more data propagation paths) from the one or more master WAP devices 104, such as the master WAP device 104A towards the one or more service WAP devices 108, such as the service WAP device 108A and the service WAP device 108B, via the network 100B of the plurality of hybrid analog-digital repeater devices 106, such as the hybrid analog-digital repeater devices 106A, 106B, and 106N. Further, in the downstream communication 114, the one or more service WAP devices 108 communicates corresponding user data to its corresponding UEs, such as the UEs 110*a*, 110*b*, and 110*c* (connected to the service WAP device 108A) and the UEs 110*d* and 110*e* (connected to the service WAP device 108B). In this embodiment, the network 100B of the plurality of hybrid analog-digital repeater devices 106 may be a daisy-chain network. The upstream communication 116 may refer to a communication path from the UEs and the one or more service WAP devices 108 towards the one or more master WAP devices 104, such as the master WAP device 104A via the network 100B of the plurality of hybrid analog-digital repeater devices 106.

In accordance with an embodiment, the central cloud server 102 may be further configured to cause the plurality of hybrid analog-digital repeater devices 106 in the wireless backhaul mesh network to relay the data traffic on the first type of polarization 118A corresponding to the first analog data link 118 of the dual analog data links 118 and 120 while the second type of polarization 120A may be configured to concurrently spatially scan a corresponding surrounding area to determine a location and a movement pattern of one or more candidate objects as signal blockers without affecting the first analog data link 118. The central cloud server 102 may be configured to relay user data on one polarization while configuring the other polarization for real-time spatial radar scanning by each hybrid analog-digital repeater device. The spare polarization may be used to scan the environment, enabling improved mapping of external objects without affecting the first analog data link 118. The scanning process on the second polarization may operate independently and may not interfere with the data transmission on the first type of polarization 118A. The technique of relaying the data traffic on the first type of polarization 118A using the second type of polarization 120A to determine the location and the movement pattern of one or more candidate objects as signal blockers may be employed in situations where proactive identification and mitigation of signal blockages may be done to maintain high network performance and reliability. By continuously monitoring the surrounding environment for potential blockers, the wireless communication system 100A may anticipate and adapt to changes in signal propagation conditions. By leveraging the dual analog data links and assigning specific tasks to each polarization, the wireless communication system 100A maximizes the utilization of available resources and enhances overall network efficiency.

In some embodiments, the central cloud server 102 may be further configured to cause the plurality of hybrid analog-digital repeater devices 106 in the wireless backhaul mesh network to relay the data traffic on the first type of polarization 118A corresponding to the first analog data link 118 of the dual analog data links 118 and 120 while the second type of polarization 120A may also be configured to further relay data traffic carrying different or same data packets without affecting the first analog data link 118. In such a case, each of the plurality of hybrid analog-digital repeater devices 106 (e.g. the hybrid analog-digital repeater devices 106A, 106B, . . . , 106N) may further transmit a third beam of RF signals carrying user data in an intermediate frequency band (e.g., mmWave frequency) in the second type of polarization 120A over a second analog data link 120 towards its neighboring repeater node, which then amplifies and relays the third beam of RF signals in the intermediate frequency (e.g., mmWave frequency) in the second type of polarization 118A in the downstream communication 114. Similarly, for the upstream communication 116, each of the plurality of hybrid analog-digital repeater devices 106 may be configured to transmit a fourth beam of RF signals carrying user data in the intermediate frequency band in the second type of polarization 120A over different time slot different towards its neighboring repeater node, which then amplifies and relays further the fourth beam of RF signal in the intermediate frequency band in the second type of polarization 120A in the upstream communication 116.

In an alternative implementation, based on an instruction received form the central cloud server 102, each of the plurality of hybrid analog-digital repeater devices 106 may be configured to execute a differential polarized routing of receive and transmit radio frequency (RF) signals in the intermediate frequency (e.g., millimeter wave frequency) in which a downstream communication 114 and an upstream communication 116 may be performed in a different polarization state (e.g., a vertical polarization and a horizontal polarization) in the network 100B of the plurality of hybrid analog-digital repeater devices 106. In this case, the first type of polarization 118A may be dedicated to the downstream communication 114 and the second type of polarization 120A may be dedicated to the upstream communication 116, thereby avoiding the need for the TDD.

In accordance with an embodiment, the central cloud server 102 may be further configured to cause the master WAP device 104A to communicate a wireless local area network (WLAN) signal 122 in a first WLAN frequency (e.g., higher frequency of the Wi-Fi® 6, 7 or 8) from the data source 112. The one or more service WAP devices 108 may be configured to receive the first beam of RF signals in the intermediate frequency band (e.g., mmWave frequencies or other intermediate frequencies in the range of 10-300 GHz) from the one or more second hybrid analog-digital repeater devices (e.g., the hybrid analog-digital repeater devices 106N) and convert back to the WLAN signal 122 to serve one or more UEs 110 in a data throughput greater than a threshold throughput. The use of plurality of hybrid analog-digital repeater devices 106 along with the different types of polarizations extends the coverage area of the one or more service WAP devices 108, allowing them to serve its corresponding UEs in areas that may have poor signal reception or are located farther away from the master WAP device 104A, without adding to latency and interference issues due to the one or more analog data propagation paths with dual-polarized signals.

In accordance with an embodiment, the central cloud server 102 may be configured to route data traffic to and from the one or more service WAP devices 108 using two different pairs of dual-polarized signals. Each pair of dual-polarized signals may take a different path through the wireless network, passing through a single chain of the plurality of hybrid analog-digital repeater devices 106 or different chains of hybrid analog-digital repeater devices among the plurality of hybrid analog-digital repeater devices 106. This provides rank-4 connectivity with completely different paths to the one or more service WAP devices 108 (e.g., the service WAP device 108A and the service WAP device 108B), thereby further enhancing resilience against blockages and interference. The rank-4 connectivity indicates multiple independent data streams that can be propagated via the hybrid repeater chains for improved wireless communication performance. For designated wireless links (e.g., certain critical links), the central cloud server 102 may be configured to coordinate between two synchronized service WAP devices, such as the service WAP devices 108A and 108B, to initiate separate streams over different RF chains. The independent streams may then be relayed through completely distinct hybrid repeater chains. This provides path redundancy to counter even simultaneous route disruptions.

In accordance with an embodiment, a donor side of each of the one or more service WAP devices 108 may be modified so that each of the one or more service WAP devices 108 may be configured to communicate with one or more hybrid analog-digital repeater devices over intermediate frequency (e.g., mmWave frequencies or other intermediate frequencies in the range of 10-300 GHz) using high-gain dual polarized antennas. In an implementation, a service side each of the one or more service WAP devices 108 may include a WLAN antenna and may not include a phase array antenna or any high-gain dual polarized antennas. Alternatively, in another implementation, the service side each of the one or more service WAP devices 108 may include a WLAN antenna and a phase array antenna. In such a case, the phase array antenna may be configured to communicate a beam of RF signals to its corresponding UEs or communicate the first WLAN signal at the same time depending on the position of its UE to be served. Alternatively, in another implementation, the service side each of the one or more service WAP devices 108 may include a phase array antenna without WLAN antenna. However, a WLAN adaptor (e.g., 2.4 GHz or 5 Ghz WLAN adaptor) may be provided in all implementations for low-frequency backchannel connectivity for the control channel.

Figure 1C:
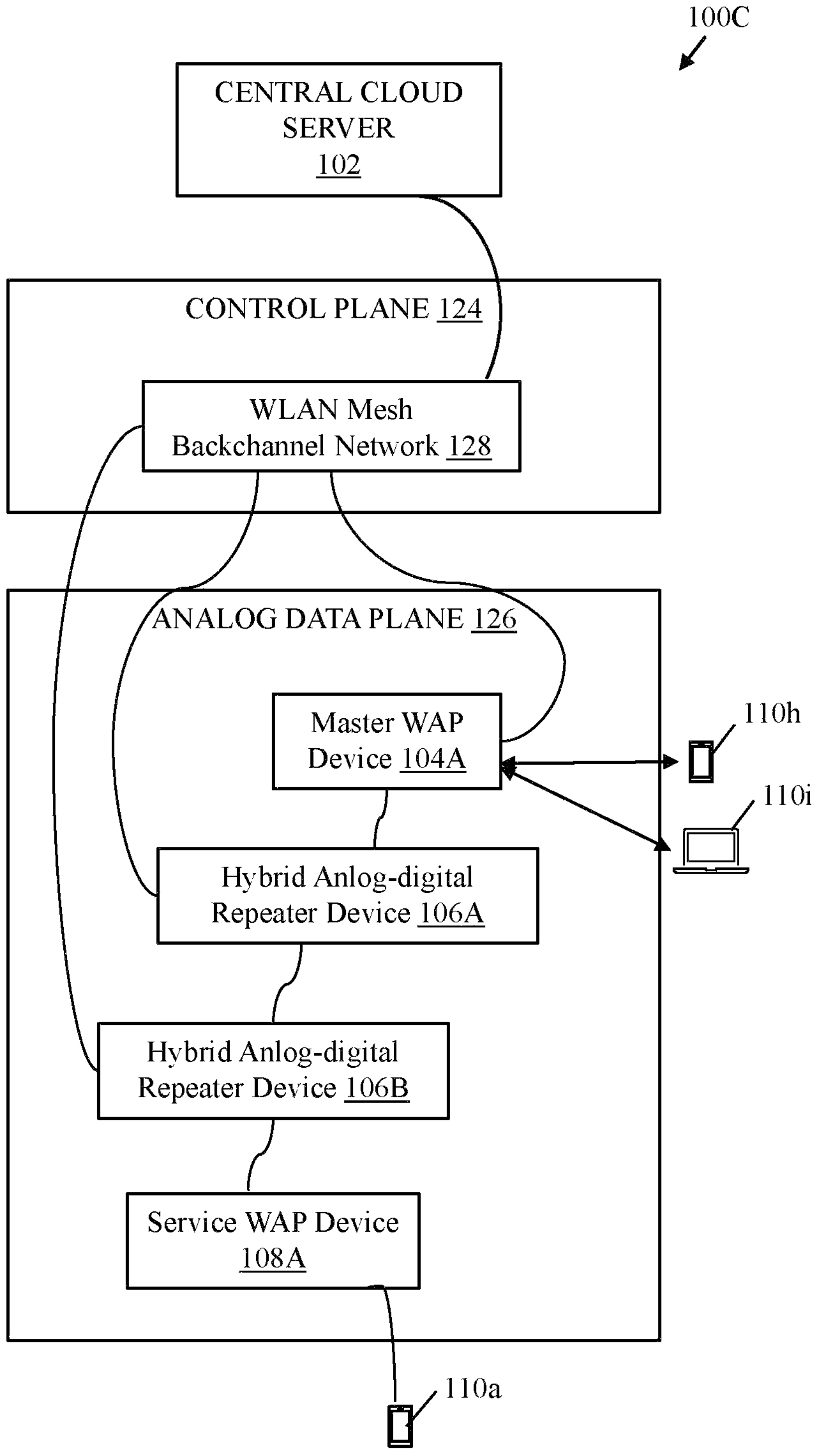
FIG. 1C is a diagram that illustrates an exemplary wireless communication system with a control plane and an analog data plane for telemetry information-based signal interference detection and mitigation in a wireless backhaul mesh network, in accordance with an exemplary embodiment of the disclosure.

FIG. 1C is a diagram that illustrates an exemplary wireless communication system with a control plane and an analog data plane for telemetry information-based signal interference detection and mitigation in a wireless backhaul mesh network, in accordance with an exemplary embodiment of the disclosure. FIG. 1C is explained in conjunction with elements from FIGS. 1A and 1B. With reference to FIG. 1C, there is shown a wireless communication system 100C with a control plane 124 and an analog data plane 126.

In accordance with an embodiment, the wireless communication system 100C may employ a software-defined networking (SDN), where the control plane 124 may be separated from the analog data plane 126. In other words, the communication in management mesh for control and remote configuration of each network node is separate and independent from the data network, i.e., analog data plane 126. The data traffic (voice, video, etc.) flows in the data propagation path in analog form through the analog data plane 126, while the control plane 124 (signaling and management) uses a separate digital network, such as the WLAN mesh backchannel network 128 (e.g., may use 2.4 GHz or 5 GHz WLAN frequency). While data traverses the analog network, an out-of-band digital connectivity enables external coordination. The access points, such as the master WAP device 104A and the service WAP device 108A, may include a high bandwidth Wi-Fi® 7 or Wi-Fi® 8 compatible multi-user (MU) MIMO capability to provide wireless connectivity even in non-line-of sight paths. The one or more UEs, such as the UE 110*h*, the 110*i*, and the UE 110*a* may be Wi-Fi® 7 or Wi-Fi® 8 enabled and may connected to the wireless network using corresponding access points, such as the master WAP device 104A and the service WAP device 108A. Each of the master WAP device 104A and the service WAP device 108A may be equipped with multiple antennas to support Multi-User MIMO (MU-MIMO), which allows them to communicate with multiple devices concurrently.

In accordance with an embodiment, the plurality of hybrid analog-digital repeater devices 106, such as the hybrid analog-digital repeater devices 106A and 106B, may be configured to dynamically adjust their network topology based on instructions from the central cloud server 102. Further, based on the different types telemetry information (described in detail, for example, in FIG. 5), the central cloud server 102 may be configured to determine how each different types of network node, i.e., the master WAP device 104A, the plurality of hybrid analog-digital repeater devices 106, and the one or more service WAP devices 108 may connect to each other, forming a wireless backhaul mesh network. This provides an enhanced resilience, where even unforeseen failures in one part of the network may be bypassed by using alternative paths. The central cloud server 102 may be further configured to generate configuration updates tailored to each node based on its capabilities and context and push these updates to individual nodes using the digital backchannel (i.e., the WLAN mesh backchannel network 128). Each network node may receive its specific configuration update and applies it within its local area. This enables flexibility and adaptability, as network nodes can adjust their behavior based on local conditions. The local conditions may refer to various factors specific to individual network nodes or their surrounding environment. These factors may influence how the network node operates and how the centralized controller, such as the central cloud server 102 configures each network node. The local conditions may include variations in received signal strength, signal-to-noise ratio, and interference levels within each network node's area, a level of activity on different frequency bands available to each network node, a number and type of devices connected to the network node, movement of users and variation in data usage (e.g., streaming, downloads) within the node's coverage area, different applications bandwidth and latency requirements (e.g., gaming, video conferencing may have varying bandwidth and latency demands), or environmental factors, such as physical obstacles, weather, temperature and humidity. Each of the one or more service WAP devices 108, such as the service WAP device 108A, may utilize a separate repeater chain to avoid relying on a single path, just like couriers taking different roads based on the control instruction from the central cloud server 102. This eliminates a single point of failure. Further, multi-source coordinated connectivity provides redundancy against impairments. In other words, by having multiple master WAP devices and service WAP devices send the same user data (data streams), even if one is affected, the others can still deliver the user data to its UE.

In accordance with an embodiment, there may be a test node or a reference node (e.g., UE 110*f* may be a CPE as a test node), such as a customer premise equipment (CPE) in the wireless communication system 100A or 100C. The test node may be used as an independent reference node to ascertain network performance characteristics periodically or continuously, such as a current SNR, SINR, RSSI, TSSI, a throughput rate when served by one of the network node (one of the service wireless access point devices or the master wireless access point device) in the wireless communication system 100A or 100C. Such network performance characteristics may be reported to the central cloud server 102. The central cloud server 102 may use the information received independently by the test node for another layer of independent performance monitoring of the wireless backhaul network and presence of interferes and blockers in the wireless communication system 100A or 100C along with the different types of telemetry information (e.g., the first type of telemetry information 508 and the second type of telemetry information 510 of FIG. 5, in an example) received from each network node. In case of detection of any performance drop, the central cloud server 102 may be further configured to detect where the fault is (i.e., identify one or more fault nodes) and accordingly re-configure one or more fault nodes to maintain or optimize the network performance (greater than defined threshold performance, for example, greater than 25 Giga byte per second throughput rate and the like).

Training phase of the neural network model 102B: The neural network model 102B may be trained using a first type of telemetry information from the repeater devices and a second type of telemetry information from the WAP devices/UEs. The first type of telemetry information and the second type of telemetry information have been described in detail, for example, in FIG. 5. In an example, the first type of telemetry information (vibrations, orientations, sensor readings etc.) and the second type of telemetry information (throughput, RSSI, locations etc.) may be preprocessed and formatted into suitable input vectors. Thereafter, relevant features may be extracted and encoded from the raw telemetry streams. In addition to the different types of telemetry information, data related to the properties of blockers may be collected. This may include information such as the type of blocker (e.g., building, tree, vehicle), its size, shape, and material properties, as well as its location and movement patterns relative to the interference affected network nodes. The data may be normalized to facilitate training convergence. Using analytical models, simulations or historical data, the neural network model 102B may learn patterns and correlations related to both RF signal interference or blockage and blocker properties. Some potential features could include the type and severity of interference (e.g. whether RF signal interferences or specific Line-of-Sight (LoS) interferences), the location and movement of blockers, the impact of blocker properties on signal propagation, and the performance metrics of the affected links. The training data may be augmented with synthetic examples that simulate various scenarios of RF signal interference or LoS interference, or blockage caused by different types of blockers with diverse properties. In an example, in practice, the RF signal interference and LoS interferences may be addressed in different ways. For example, beam alignment and polarization-based optimizations may be done to address the RF signal interferences and degradation, whereas beam routing may be done to address static and dynamic LoS interferences. This can help the neural network learn to recognize and adapt to a wider range of blocker-induced interference, or different types of interference and blockage patterns. The augmented training data may be used to update the weights and biases of the neural network model 102B through backpropagation and optimization algorithms. The training process may be monitored using appropriate metrics on the validation set to detect overfitting or underfitting. The neural network model 102B may learn to predict the impact of blockers on signal interference and blockage based on their properties and the different types of telemetry information. Throughout the disclosure, the term signal interference may include different types of interferences, including but not limited to the RF signal interference and/or the LoS interferences. The neural network model 102B may be a deep neural network model with multiple hidden layers employed to effectively model the highly non-linear mapping from the telemetry data to the beam parameters. The model architecture (number of layers, nodes, connections) may be iteratively tuned based on validation performance. The full preprocessed telemetry dataset (i.e., training datasets) may be split into training, validation and test sets while maintaining spatial and temporal coherence in these splits. The neural network model 102B may be then trained using the telemetry input-output pairs in batches using optimization techniques like gradient descent. Known techniques like dropout and regularization may be used to prevent overfitting. The validation set may be then used for tracking generalization performance and tuning hyperparameters. As the wireless backhaul starts operating, new streams of telemetry data may be continued to be collected and updated for training purposes. The neural network model 102B may be periodically retrained and fine-tuned in an online learning fashion on the new telemetry information to continue improving accuracy over time. In some implementations, multiple neural network models with different architectures may be trained in parallel using ensemble methods, where outputs may then be ensembled (e.g. averaged) to improve the overall prediction robustness. For example, in some cases, recurrent neural network (RNN) models or GNN may be trained on the historical telemetry data to capture temporal patterns. These RNNs may forecast short-term network traffic load based on detected daily/weekly cyclic patterns in throughput, RSSI etc. This enables proactively load balancing traffic across the backhaul mesh before congestion occurs. Further, in another example, convolutional neural networks (CNNs) may be trained to detect anomalies in infrared/thermal camera feeds of the repeater devices. These CNNs, GNNs may be combined with RNNs to predict hardware degradations or impending failures based on temporal evolution of the detected anomalies. This allows proactively scheduling maintenance and avoiding failure events that disrupt the backhaul mesh. Furthermore, instead of training from scratch, the neural network model 102B may leverage transfer learning from pre-trained models on similar wireless domains. This accelerates convergence and allows effective training on relatively smaller operational telemetry datasets. The holistic training pipeline may thereby produce an ensemble of specialized neural network models that collectively analyze the multidimensional telemetry data where the trained neural network model 102B may be evaluated on the testing set to assess its ability to accurately detect and respond to RF signal interference or blockage caused by blockers with different properties. Appropriate metrics to measure its performance, such as precision, recall, and F1 score, as well as metrics specific to blocker property prediction may be used. The trained neural network model, hereinafter referred to as the neural network model 102B maybe deployed in the central cloud server 102 to detect, diagnose, and mitigate RF signal interference or blockage in real-time, taking into account the properties of blockers. Its performance may be monitored and new data on blocker or interferers properties may be collected to retrain and update the neural network model 102B periodically, ensuring its adaptability to changing network conditions, interference patterns, and blocker characteristics.

Figure 2:
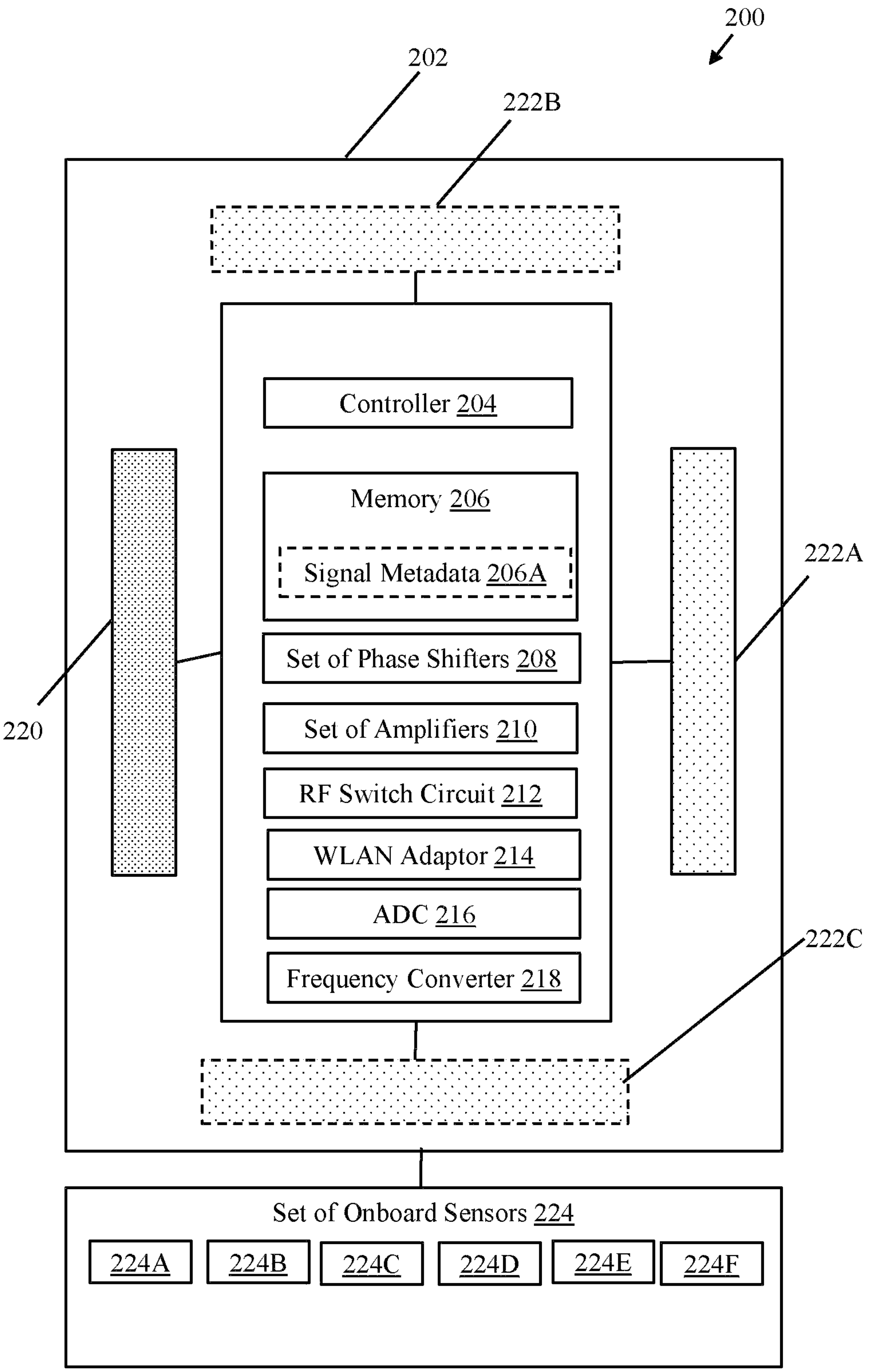
FIG. 2 is a block diagram that illustrates various components of an exemplary hybrid analog-digital repeater device in a wireless communication system, in accordance with an exemplary embodiment of the disclosure.

FIG. 2 is a block diagram that illustrates various components of an exemplary hybrid analog-digital repeater device in a wireless communication system, in accordance with an exemplary embodiment of the disclosure. FIG. 2 is explained in conjunction with elements from FIGS. 1A, 1B and 1C. With reference to FIG. 2, there is shown a block diagram 200 of a hybrid analog-digital repeater device 202. The hybrid analog-digital repeater device 202 may correspond to the plurality of hybrid analog-digital repeater devices 106.

The hybrid analog-digital repeater device 202 may include a controller 204, a memory 206, a set of phase shifters 208, a set of amplifiers 210, a radio frequency (RF) switch circuit 212, a wireless local area network (WLAN) adaptor 214, an analog-to-digital converter (ADC) 216, and a frequency converter 218. The hybrid analog-digital repeater device 202 may further include a donor antenna 220 and one or more service phased antenna arrays 222A, 222B, and 222C. Each of the plurality of hybrid analog-digital repeater devices 106 may further include a set of onboard sensors 224.

The controller 204 may be a Field Programmable Gate Array (FPGA), which may be configured to manage digital functions like the first type of telemetry information processing, parameter extraction and control channel interface to the central cloud server 102. The controller 204 may be configured to receive an incoming RF signal relay from an upstream node and relay the incoming RF signal to one or more neighboring nodes. The controller 204 may be configured to extract the signal metadata 206A by digital signal processing of a portion (e.g., a header portion) of the first beam of RF signals without decoding the user data of the first beam of RF signal.

The memory 206 may include suitable logic, circuitry, and/or interfaces that may be configured to store instructions executable by the controller 204. The memory 206 may temporarily store and update the telemetry information (i.e., the first type of telemetry information), which may be periodically communicated to the central cloud server 102. Examples of implementation of the memory 206 may include, but not limited to, a random access memory (RAM), a dynamic random access memory (DRAM), a static random access memory (SRAM), a processor cache, a thyristor random access memory (T-RAM), a zero-capacitor random access memory (Z-RAM), a read only memory (ROM), a hard disk drive (HDD), a secure digital (SD) card, a flash drive, cache memory, and/or other non-volatile memory. The memory 206 may store the signal metadata 206A.

The set of phase shifters 208 may be configured to perform precise phase control to digitally steer beams in directed orientations based on control instructions received from the central cloud server 102 or one of the network nodes under control of the central cloud server 102.

The set of amplifiers 210 may be configured to provide signal gain to overcome propagation losses and boost SNR to maintain link budgets over multiple hops of relaying, such as across the plurality of hybrid analog-digital repeater devices 106, all the way to the one or more UEs 110. The set of amplifiers 210 may be high-gain amplifiers designed to operate in the intermediate frequency bands (e.g., mmWave frequencies in 24-300 GHz or other intermediate frequencies in the range of 10-300 GHz).

The RF switch circuit 212 may be connected to the set of amplifiers 210. The RF switch circuit 212 may be configured to perform dynamic beam steering by switching between different service phased antenna arrays, such as the one or more service phased antenna arrays 222A, 222B, and 222C to route RF signals along different directions as required. This enables adaptable signal propagation, responding to changing network conditions and optimizing communication paths for improved reliability and performance. This dynamic beam steering capability is particularly beneficial in scenarios where the environment or network conditions may vary, allowing the wireless communication system 100A or 100C to adapt and maintain efficient signal transmission.

The WLAN adaptor 214 may be configured to handle lower WLAN frequencies (e.g., 2.4 GHz or 5 GHz in Wi-Fi®7 or 8) to establish a backchannel communication link. This may be used for various purposes, including management and coordination between devices in a wireless network. The WLAN adaptor 214 may be configured to provide a backchannel connectivity and control of the network of the plurality of hybrid analog-digital repeater devices 106 via a second WLAN frequency, based on the signal metadata 206A of the first beam of RF signal.

The ADC 216 may be configured to convert a header portion of a RF signal (in intermediate frequency or WLAN frequency) from analog to digital domain. While the data path remains entirely analog for lowest latency, each of the plurality of hybrid analog-digital repeater devices 106, such as the hybrid analog-digital repeater device 202 may extract the signal metadata 206A from RF signals for analysis. This allows deriving wireless metrics like timing parameters, signal quality, interference levels, channel state information, and reference signals using DSP techniques.

The frequency converter 218 may be configured to upconvert or down convert one radio frequency to another radio frequency of an RF signal. For example, the hybrid analog-digital repeater device 202 may utilize the frequency converter 218 to convert a WLAN signal to a beam of RF signals in an intermediate frequency band (e.g., mmWave frequencies or other intermediate frequencies in the range of 10-300 GHz). The frequency converter 218 may perform frequency up conversion by frequency mixing of the WLAN signal with a local oscillator signal, generating an intermediate frequency (e.g., mmWave frequencies or other intermediate frequencies in the range of 10-300 GHz) for improved wireless communication performance. In some embodiments, the frequency converter 218 may include a phased locked loop (PLL) circuit, which acts as a local oscillator.

The donor antenna 220 may be communicatively coupled to a cascading receiver chain comprising various components (e.g., a set of low noise amplifiers (LNA), a set of receiver front end phase shifters, and a set of power combiners) for the signal reception (not shown for brevity). The donor antenna 220 may be configured to receive an incoming RF signal from an upstream node. The donor antenna 220 may be an WLAN antenna or a phase array antenna, such as a dual-polarized antenna.

The one or more service phased antenna arrays 222A, 222B, and 222C may be configured to relay a beam of RF signals to one or more neighboring downstream nodes. Each of the one or more service phased antenna arrays 222A, 222B, and 222C may be dual-polarized antennas, where separate antenna arrays or same antenna array with partitions (logical partitioning of antenna elements) may be used for horizontal and vertical polarizations allowing polarization diversity mechanisms. Each of the plurality of hybrid analog-digital repeater devices 106 (such as the hybrid analog-digital repeater device 202) may include multiple phased array antennas (e.g., the one or more service phased antenna arrays 222A, 222B, and 222C) with electrically steerable directive beams to focus signals along narrow beams. The phase antenna arrays may include individual phase shifters and amplifiers behind each radiating element to shape and control the beam pattern digitally.

The set of onboard sensors 224 may include one or more image sensors 224A, a lidar sensor 224B, a Radar 224C, a spatial position sensor 224D, an inertial measurement unit (IMU) sensor 224E, and a temperature sensor 224F. A wide range of sensors may be integrated or connected to each analog hybrid analog-digital repeater device of the plurality of hybrid analog-digital repeater devices 106 to enrich each analog hybrid analog-digital repeater device with environmental awareness for intelligent intra-node and inter-node optimizations. The one or more image sensors 224A may be used to visually monitor the surroundings of each network node (i.e., each analog hybrid analog-digital repeater device). Examples of the one or more image sensors 224A may include but are not limited to color image sensors (e.g., high-resolution RGB sensor) and infrared image sensors (e.g., IR cameras). The lidar sensor 224B may be referred to as light detection and ranging sensors used to enable accurate three-dimensional (3D) profiling and depth perception of surroundings of each network node (i.e., each analog hybrid analog-digital repeater device) for precise beam alignment. The Radar 224C may be a built-in radar to detect and track motion to monitor movement patterns of surrounding objects and predict potential RF signal blockers. The spatial position sensor 224D may be a global navigation satellite system (GNSS) sensor, such as global positioning system (GPS) to provide location awareness for each network node used for geospatial analytics and positioning capabilities. The IMU sensor 224E may include a combination of accelerometers, gyroscopes, and magnetometers (sometimes magnetometers may not be used) that typically measures body's specific force, angular rate, and orientation of a given body. In this case, such raw IMU output may be processed to measure node vibrations, shocks, and orientation changes at each network node (i.e., each analog hybrid analog-digital repeater device).

Figure 3:
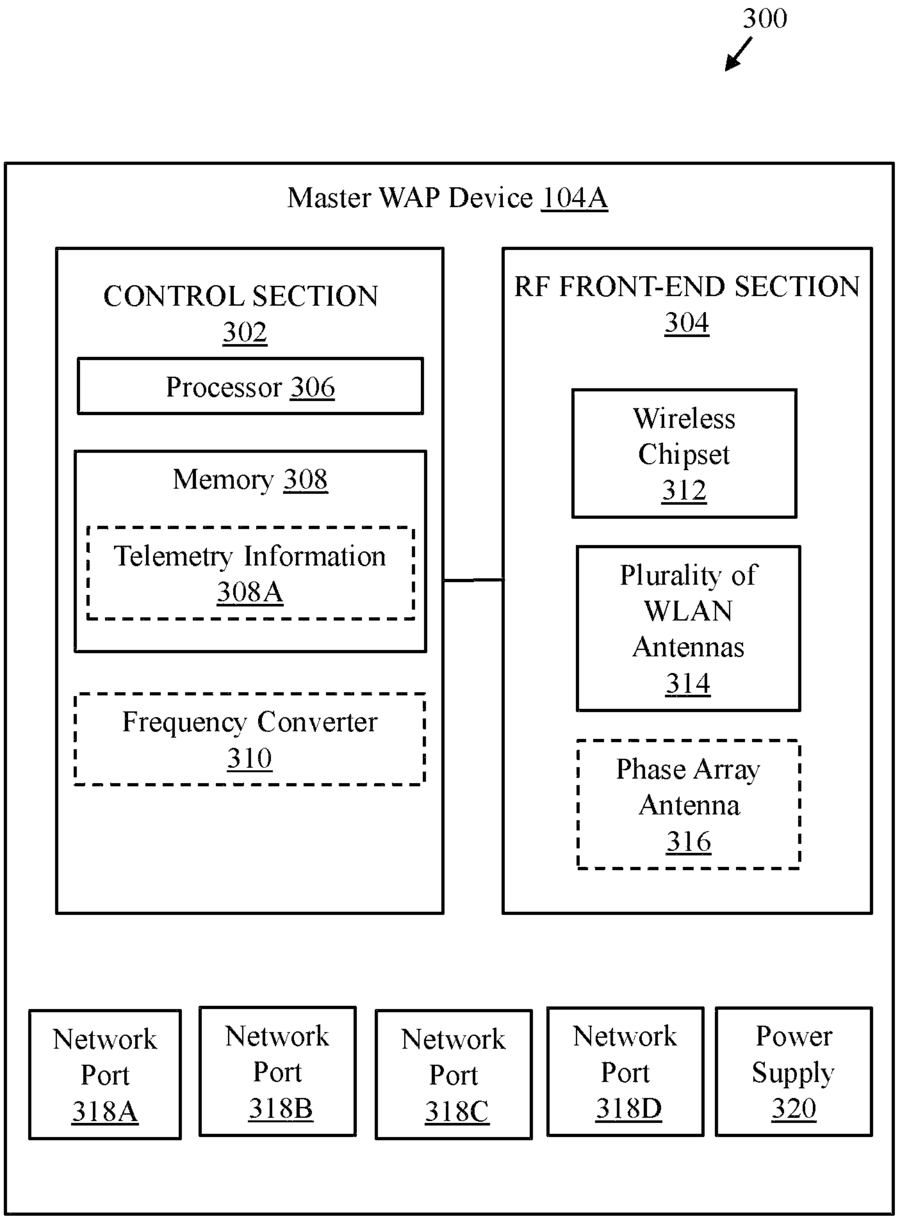
FIG. 3 is a block diagram that illustrates various components of an exemplary master wireless access point (WAP) device in a wireless communication system, in accordance with an exemplary embodiment of the disclosure.

FIG. 3 is a block diagram that illustrates various components of an exemplary master wireless access point (WAP) device in a wireless communication system, in accordance with an exemplary embodiment of the disclosure. FIG. 3 is explained in conjunction with elements from FIGS. 1A, 1B, 1C, 2A, and 2B. With reference to FIG. 3, there is shown a block diagram 300 of the master WAP device 104A. The master WAP device 104A may correspond to the one or more master WAP devices 104 (FIG. 1A). The master WAP device 104A may include a control section 302 and a front-end RF section 304. The control section 302 may include a processor 306 and a memory 308, which may include the telemetry information 308A (i.e., the second type of telemetry information). In an implementation, the control section 302 may include a frequency converter 310. In some implementations, the frequency converter 310 may not be provided. The front-end RF section 304 may include a wireless chipset 312 and a plurality of WLAN antennas 314. In some implementations, the master WAP device 104A may be modified to further include a high-gain dual polarized antenna, such the phase array antenna 316. The master WAP device 104A may include a plurality of network ports, such as network ports 318A to 318D, and a power supply 320. The processor 306 may be communicatively coupled to the memory 308, the frequency converter 310 (when provided), and the different components of the front-end RF section 304 and the master WAP device 104A.

The processor 306 may be configured to communicate a wireless local area network (WLAN) signal in a first WLAN frequency from the data source 112. The processor 306 may be responsible for overall processing tasks, routing data and managing network operations and receiving instructions from the central cloud server 102. The processor 306 may be a multi-core processor to handle the increased demands of Wi-Fi@ 7 or 8, beamforming, and Mu-MIMO.

The memory 308 may include the telemetry information 308A. The telemetry information 308A may be the second type of telemetry information associated with the UEs connected directly to the master WAP device 104A or via the one or more service WAP devices 108. Additionally, telemetry information 308A (i.e., the second type of telemetry information) may comprise a unique identifier (ID) of the master WAP device 104A, its geo-location, an operational state of the master WAP device 104A, and the signal metadata of WLAN signals or mmWave signals communicated by the master WAP device 104A. The memory 308 may further store temporary data and processing buffers to maintain smooth network performance. Examples of the implementation of the memory 308 may be similar to that of the memory 206 of FIG. 2.

The frequency converter 310 may be present when a functionality of the root node (one of the hybrid analog-digital repeater device) is implemented in the master WAP device 104A. When present, the frequency converter 310 may be used to up convert or down convert frequencies.

The wireless chipset 312 may be a hardware component responsible for transmitting and receiving WLAN (Wi-Fi®) signals, supporting multiple frequency bands (e.g., 2.4 GHz, 5 GHz, and 6 GHz bands or 6-9 GHz bands), and processing radio signals, such as modulation, demodulation, filtering, and amplification to ensure seamless communication with the one or more Wi-Fi® enabled UEs 110. The wireless chipset 312 may include radio elements that may convert digital data into radio waves for transmission and vice versa.

The plurality of WLAN antennas 314 may be configured to transmit and receive WLAN (Wi-Fi®) signals. The plurality of WLAN antennas 314 may be in MIMO configuration for performing MU-MIMO and beamforming to enhance coverage and signal strength, for the one or more UEs 110. The number of antennas in the MIMO configuration may vary depending on use case (e.g., consumer grade or enterprise grade), for example 2×2, 4×4 or 8×8 MIMO configurations may be provided.

In some implementations, alternatively, the master WAP device 104A may be modified to include one or more high-gain antennas, such as the phase array antenna 316 to capture a 5G or 6G mmWave cellular signal from a radio access network (RAN) node (e.g., a gNB or a 5G or 6G small cell) and/or to relay a mmWave signal to one or more hybrid analog-digital repeater devices of the plurality of hybrid analog-digital repeater devices 106.

The network port 318A may be an optical fiber port. The network port 318B may be an Ethernet port. The network port 318C may be a WLAN Fast Ethernet (FE) port. The network port 318D may be a USB port. The power supply 320 may be configured to provide power to the various components of the master WAP device 104A.

Figure 4:
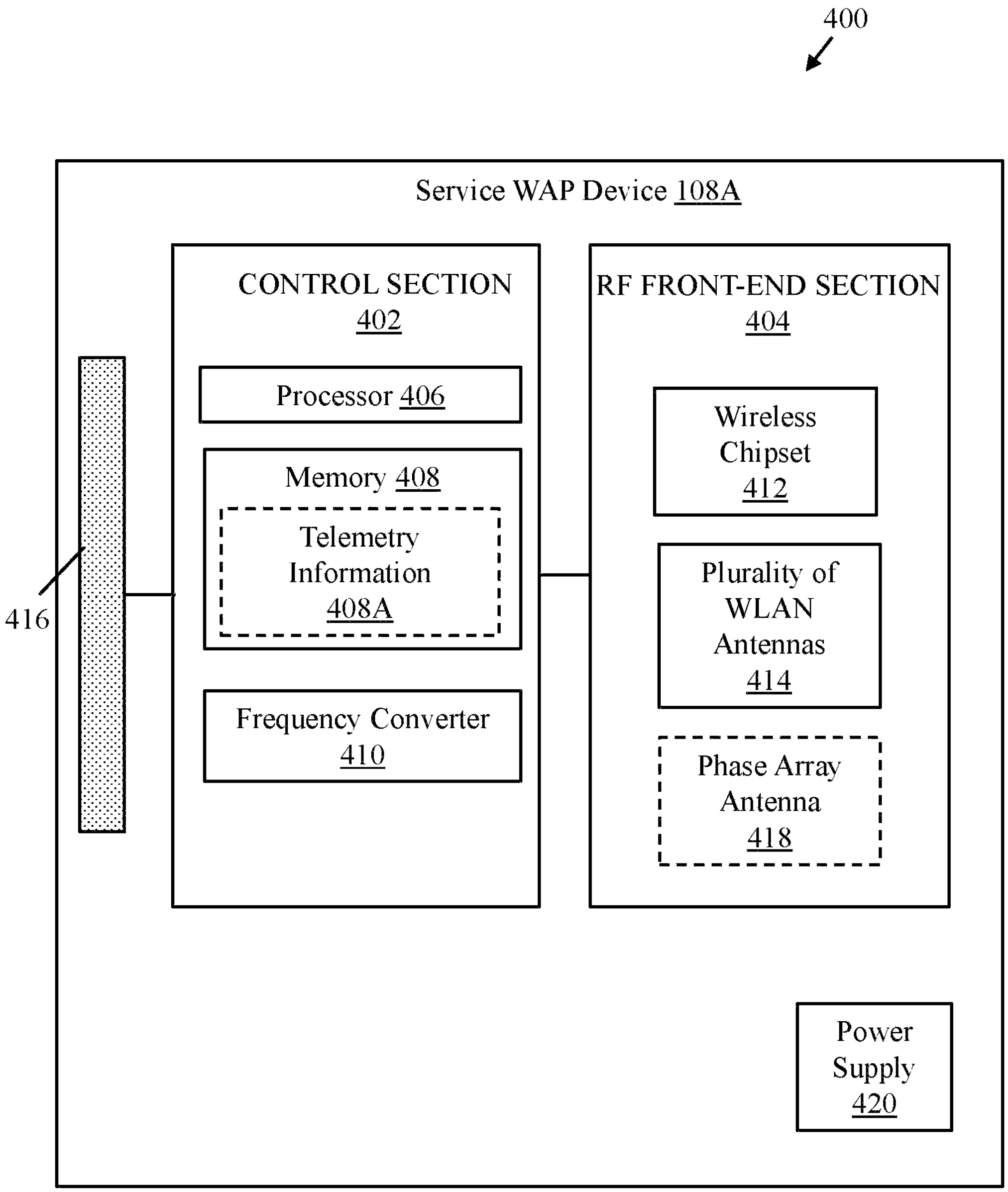
FIG. 4 is a block diagram that illustrates various components of an exemplary service WAP device in a wireless communication system, in accordance with an exemplary embodiment of the disclosure.

FIG. 4 is a block diagram that illustrates various components of an exemplary service WAP device in a wireless communication system, in accordance with an exemplary embodiment of the disclosure. FIG. 4 is explained in conjunction with elements from FIGS. 1A, 1B, 1C, 2A, 2B, and 3. With reference to FIG. 4, there is shown a block diagram 400 of the service WAP device 108A. The service WAP device 108A may correspond to the one or more service WAP devices 108 (FIG. 1A). The service WAP device 108A may include a control section 402 and a front-end RF section 404. The control section 402 may include a processor 406 and a memory 408 (with telemetry information 408A), and a frequency converter 410. The front-end RF section 404 may include a wireless chipset 412, a plurality of WLAN antennas 414. In some implementations, the service WAP device 108A may be modified to further include a high-gain dual polarized antenna, such the phase array antenna 416 at a donor side connected to a donor port. In an implementation, the service side may have the plurality of WLAN antennas 414. In another implementation, the service side may include another high-gain antenna, such as a phase array antenna 418 along with the plurality of WLAN antennas 414. In some implementations, the network ports for wired communication may not be provided as it primarily interfaces with wireless WLAN devices. However, in some cases, the network ports like the master WAP device 104A may be provided. The processor 406 may be communicatively coupled to the memory 408, the frequency converter 410 and the different components of the front-end RF section 404. The service WAP device 108A may further include a power supply 420 to provide power to the various components of the service WAP device 108A.

The processor 406 may be configured to receive a first beam of RF signals in the intermediate frequency band (e.g., mmWave frequencies or other intermediate frequencies in the range of 10-300 GHz) from the one or more second hybrid analog-digital repeater devices (e.g., one or more of the hybrid analog-digital repeater devices 106B to 106N) and convert back to the WLAN signal to serve one or more UEs 110 in a data throughput greater than a threshold throughput (e.g., 30-100 Gbps).

The memory 408 may include the telemetry information 408A, which may be the second type of telemetry information 408A associated with its connected UEs. Additionally, the telemetry information 408A (i.e., the second type of telemetry information) may comprise a unique identifier (ID) of the service WAP device 108A, its geo-location, an operational state of the service WAP device 108A, and the signal metadata of WLAN signals or mmWave signals received/transmitted by the service WAP device 108A. Examples of the implementation of the memory 408 may be similar to that of the memory 206 of FIG. 2.

The frequency converter 410 may be used to convert the first beam of RF signals in the intermediate frequency band to the first WLAN frequency (e.g., within 6-9 GHz). In some cases, the intermediate frequency may be converted to another intermediate frequency for wide beam relay. Examples of implementation of the wireless chipset 412, the plurality of WLAN antennas 414, the phase array antennas 416 and 418 may be similar to that of the master WAP device 104A of FIG. 3.

Figure 5:
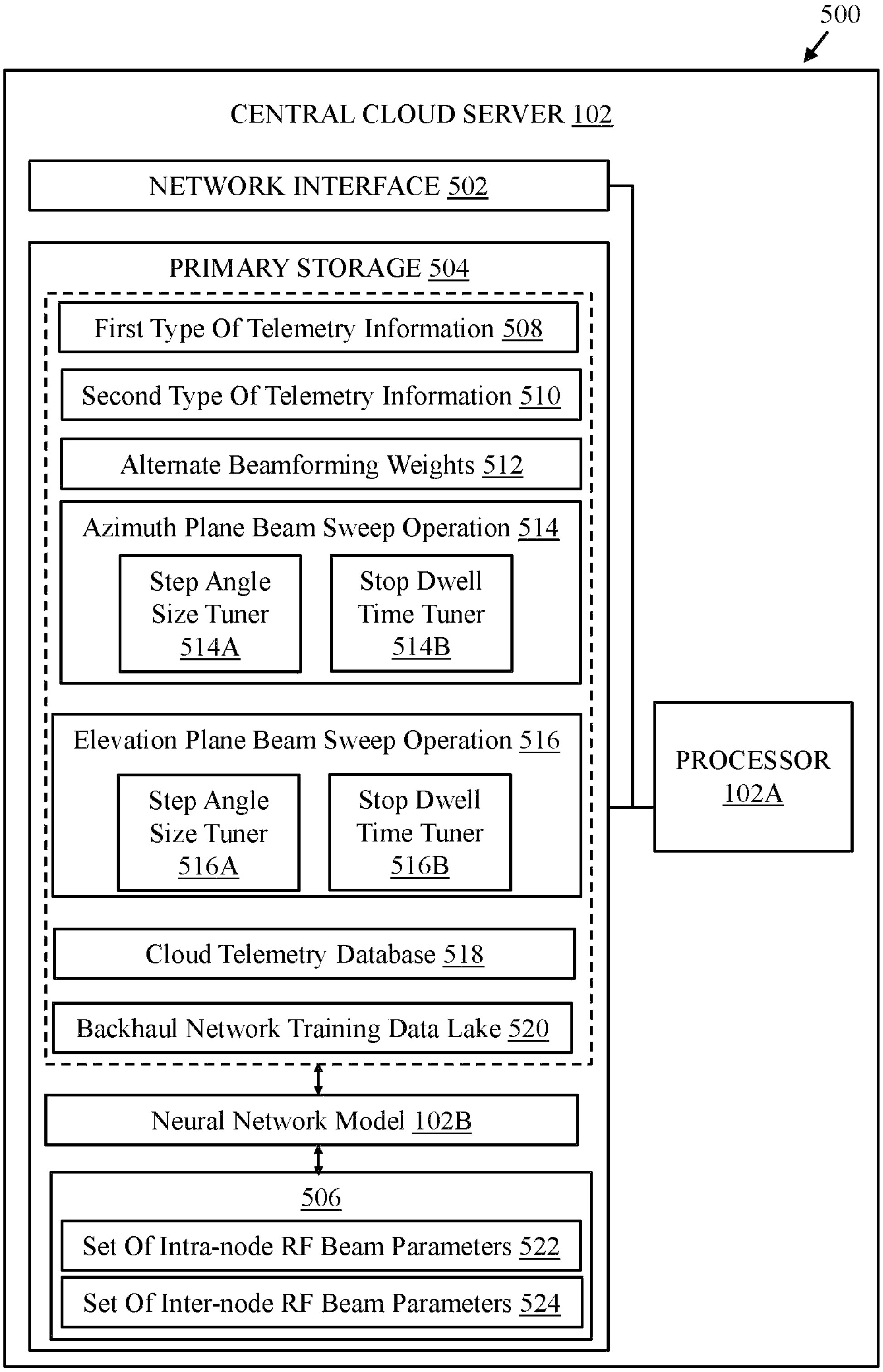
FIG. 5 is a block diagram that illustrates various components of an exemplary central cloud server for telemetry information-based signal interference detection and mitigation in a wireless backhaul mesh network in a wireless communication system, in accordance with an exemplary embodiment of the disclosure.

FIG. 5 is a block diagram that illustrates various components of an exemplary central cloud server for telemetry information-based signal interference detection and mitigation in a wireless backhaul mesh network in a wireless communication system, in accordance with an exemplary embodiment of the disclosure. FIG. 5 is explained in conjunction with elements from FIGS. 1A, 1B, 1C, 2A, 2B, 3, and 4. With reference to FIG. 5, there is shown a block diagram 500 of the central cloud server 102. The central cloud server 102 may include the processor 102A, the neural network model 102B, a network interface 502 and a primary storage 504. The primary storage 504 may include an environment-aware enhanced backhaul network database 506, a first type of telemetry information 508, a second type of telemetry information 510, alternate beamforming weights 512, an azimuth plane beam sweep operation 514, an elevation plane beam sweep operation 516, a cloud telemetry database 518, and a backhaul network training data lake 520. The environment-aware enhanced backhaul network database 506 may include a set of intra-node radio frequency (RF) beam parameters 522 and a set of inter-node RF beam parameters 524. The azimuth plane beam sweep operation 514 may include a step angle size tuner 514A and a stop dwell time tuner 514B. The elevation plane beam sweep operation 516 may also include a step angle size tuner 516A and a stop dwell time tuner 516B.

In operation, there may be an initial network set up phase. The central cloud server 102 may be configured to establish a dedicated control channel via the control plane 124 for secure communication between the central cloud server 102 and each of the plurality of hybrid analog-digital repeater devices 106. For example, the central cloud server 102 may be configured to establish a digital backchannel (e.g., the WLAN mesh backchannel network 128) via a wireless local area network (WLAN) frequency (e.g., may use existing 2.4 GHz or 5 GHz WLAN frequency). Each of the plurality of hybrid analog-digital repeater devices 106 may be assigned a unique identifier (ID) during manufacturing. This allows the central cloud server 102 to identify and communicate with each hybrid analog-digital repeater device individually over the WLAN mesh backchannel network 128 for control and configuration purposes. This initial WLAN mesh backchannel network 128 may be established on lower frequencies (e.g., existing Wi-Fi® frequencies like 2.4/5 GHz may be leveraged) allows the central cloud server 102 to initiate data ingestion of received data from each network node. Each of the plurality of hybrid analog-digital repeater device 106 may be initialized to be receptive to the central cloud server's instructions. This may involve activating each network node to be connected to a WLAN network. The central cloud server 102 may be configured to broadcast a network name, such as a service set identifier (SSID), of the WLAN mesh backchannel network 128, allowing each network node including the plurality of hybrid analog-digital repeater device 106 strategically deployed within range to detect and connect to the WLAN mesh backchannel network 128. Each of the plurality of hybrid analog-digital repeater devices 106 may scan and identify the WLAN mesh backchannel network 128 using its SSID and establish a connection to it. Once connected, authentication operations and/or mechanisms (e.g., WPA2-PSK) may be employed to verify the identity of the network nodes and ensure secure communication. In an example, encryption protocols (e.g., AES) may then be applied to protect control instructions and configurations transmitted over the backchannel, i.e., the WLAN mesh backchannel network 128. Furthermore, encryption keys may be securely embedded into each of the plurality of hybrid analog-digital repeater devices 106 during deployment. The encryption keys rotation may be done automatically over-the-air periodically by the central cloud server 102.

The central cloud server 102 may be further configured to obtain the first type of telemetry information 508 from the plurality of hybrid analog-digital repeater devices 106. Each of the plurality of hybrid analog-digital repeater devices 106 may include the set of onboard sensors 224, which may capture sensor data to enrich each analog hybrid analog-digital repeater device with environmental awareness for intelligent intra-node and inter-node optimizations. The central cloud server 102 may be configured to obtain real-time or near real time telemetry information (i.e., the first type of telemetry information 508) from the plurality of hybrid analog-digital repeater devices 106 including traffic loads, latency, signal quality metrics, interference levels, and the captured sensor data.

In accordance with an embodiment, the first type of telemetry information 508 obtained from the plurality of hybrid analog-digital repeater devices 106 may comprise a unique identifier (ID) of each of the plurality of hybrid analog-digital repeater devices 106, a geo-location of each of the plurality of hybrid analog-digital repeater devices 106, an operational state of the plurality of hybrid analog-digital repeater devices 106, and signal metadata 206A of an incoming beam of RF signals at each of the plurality of hybrid analog-digital repeater devices 106. Each of the plurality of hybrid analog-digital repeater devices 106 may be assigned a unique identifier, allowing for individual identification, and tracking within via the WLAN mesh backchannel network 128. This helps in management, troubleshooting, and monitoring purposes. During the initial network set up phase, the central cloud server 102 may be further configured to acquire the geo-location of each of the plurality of hybrid analog-digital repeater devices 106 using the spatial position sensor 224D provided in the set of onboard sensors 224 of each hybrid analog-digital repeater device. The geo-location of each of the plurality of hybrid analog-digital repeater devices 106 may be in latitudes and longitudes pairs, which may be normalized by the central cloud server 102 to range between 0 and 1. Such preprocessing may also be done for other raw telemetry information (i.e., the first type of telemetry information 508) obtained from the plurality of hybrid analog-digital repeater devices 106 and the preprocessed data may be stored in the cloud telemetry database 518. The operational state of the plurality of hybrid analog-digital repeater devices 106 may indicate whether a given hybrid analog-digital repeater device is active and communicating one or more data streams with an upstream node or one or more downstream neighboring nodes, or not active and not communicating data streams to any of the one or more downstream neighboring nodes or the upstream node. The operational state may provide insights into whether each of the plurality of hybrid analog-digital repeater devices 106 are functioning properly, are offline, or experiencing issues. The monitoring of the operational state may be useful in proactive maintenance and fault detection.

In accordance with an embodiment, the first type of telemetry information 508 may include the signal metadata 206A of the incoming beam of RF signals at each of the plurality of hybrid analog-digital repeater device 106. The signal metadata 206A may comprise timing information associated with a radio frame of the incoming beam of RF signals, system information, channel state information, a cell identity (ID), a beam ID, a signal strength, a signal to noise ratio (SNR), an interference level, or other signal quality metrics. The timing information associated with the radio frame of the incoming beam of RF signals may indicate timing characteristics of the incoming RF signals used for synchronization and coordination within the network. The timing information may include frame timing, which is indicative of a start and duration of the radio frame within which data is transmitted. This timing synchronization ensures that the transmitter and receiver are aligned, enabling accurate decoding of the transmitted information. The system information may include details about the wireless network parameters, such as cell identity (ID), a frequency band allocated to tune into the correct frequency for communication, system bandwidth that specifies the total bandwidth available for communication used to determine the maximum data rates supported by the network, a Modulation and Coding Scheme (MCS) that defines the modulation scheme and coding rate used for data transmission, transmission power levels indicative of available transmission power levels allowed in the network used to optimize coverage and interference. The channel state information may indicate the current state of the wireless communication channel between a transmitter and a receiver, and may include, for example, a channel response (indicates about signal attenuation, phase shifts, and multipath propagation), a channel frequency response (indicates how the channel responds to signals at different frequencies), Signal-to-Noise Ratio (SNR), channel capacity, spatial correlation (indicates the spatial characteristics of the channel, such as information about signal arrival angles and signal strengths from different directions), and channel coherence time (indicates the time duration over which the channel remains relatively constant).

In accordance with an embodiment, the central cloud server 102 may be further configured to obtain beam labels from each of the plurality of hybrid analog-digital repeater devices 106 as a part of the first type of telemetry information 508. The beam labels may be obtained by activating an exhaustive beam search procedure and detecting the highest power beam available at each node. An initial dataset that may comprise location-beam pairs may be generated for different times of day. The location-beam pairs may be for multiple routes that pass through different neighboring nodes surrounding each of the plurality of hybrid analog-digital repeater devices 106. The initial dataset of the location-beam pairs may capture information about the possible routes and beams that can be used at different times of day when routing data signals through the network of plurality of hybrid analog-digital repeater devices 106 and their neighboring nodes. The data of location-beam pairs for different times may account for variations in conditions or interference that may impact which routes and/or beams are optimal in terms of signal strength and data throughput at different points in time.

In accordance with an embodiment, the first type of telemetry information 508 obtained from the plurality of hybrid analog-digital repeater devices 106 may further comprise surrounding-environment sensed information, which may be sensed by the set of onboard sensors 224 at each of the plurality of hybrid analog-digital repeater devices 106. The surrounding-environment sensed information may comprise visual information surrounding of each of the plurality of hybrid analog-digital repeater devices 106, light detection and ranging (Lidar) sensor information, and motion tracking data of one or more moving objects surrounding each of the plurality of hybrid analog-digital repeater devices 106. The integration of sensor data, including visual information, Lidar sensor information, and motion tracking data, into telemetry information obtained from the plurality of hybrid analog-digital repeater devices 106 may be used to create a rich and detailed understanding of the environment surrounding each hybrid analog-digital repeater device. By combining data from multiple sensors, the central cloud server 102 may be configured to construct a unified 3D environmental model (may also be referred to as a unified 3D environmental representation) indicative of a holistic 3D representation of the surroundings, allowing it to capture visual details, accurately profile the environment in three dimensions, and track the movement of objects in real-time. In other words, a comprehensive digital twin representation of the network's surroundings may be generated using positional, motion, and thermal information. This integration enhances situational awareness within the network to respond effectively to dynamic environmental changes. The unified 3D environmental model may enable real-time or near real-time simulation, monitoring, and optimization of network performance, allowing for proactive maintenance, efficient resource allocation, and adaptive configuration. Furthermore, specific sensor capabilities such as radar-based motion detection and Lidar-based 3D profiling enable the central cloud server 102 to identify movement patterns, predict potential obstructions or blockers, and precisely align signal beams for optimal network coverage and efficiency.

In accordance with an embodiment, the first type of telemetry information 508 may further comprise vibration information indicative of a change in vibration detected at each of the plurality of hybrid analog-digital repeater devices 106. The central cloud server 102 may be configured to monitor vibration information over a period at each of the plurality of hybrid analog-digital repeater devices 106. The IMU sensor 224E may be configured to output raw IMU data, which may be processed to measure node vibrations, shocks, and orientation changes at analog hybrid analog-digital repeater device.

In accordance with an embodiment, the first type of telemetry information 508 further may further comprise antenna array orientation change information indicative of a change in an orientation of a donor antenna 220 and one or more service phased antenna arrays 222A, 222B, and 222C of each of the plurality of hybrid analog-digital repeater devices 106. The change in the orientation of the donor antenna 220 and the one or more service phased antenna arrays 222A, 222B, and 222C may impact the quality of signal reception and transmission, so monitoring the antenna array orientation change information may be useful to determine if orientation changes may be contributing to issues like coverage holes or interference.

The central cloud server 102 may be further configured to obtain a second type of telemetry information 510 from the master WAP device 104A and the one or more service WAP devices 108. The second type of telemetry information 510 may be different from the first type of telemetry information 508. The first type of telemetry information 508 may be related to the state of the repeater devices themselves (i.e. performance of the plurality of hybrid analog-digital repeater devices 106), whereas the second type of telemetry information 510 may be related to the performance metrics and characteristics of the end user devices connected to the WAP devices (the master WAP device 104A and the one or more service WAP devices 108) in the network, providing insights into the user experience.

In accordance with an embodiment, the second type of telemetry information 510 obtained from the master WAP device 104A and the one or more service WAP devices 108 may comprise user equipment (UE) related information of one or more UEs wirelessly connected to a corresponding wireless access point pertaining to the master WAP device 104A and the one or more service WAP devices 108. In an implementation, the UE related information in the second type of telemetry information 510 may comprise a Received Signal Strength Indicator (RSSI), a throughput, a latency, a packet loss measurement, a channel utilization, an interference level, a retransmission or error rate, device information, and location data associated with each UE of the one or more UEs connected to the corresponding wireless access point. The interference level may be for signal interference and may include different types of interferences, including but not limited to the RF signal interference and/or the LoS interferences. Certain environmental conditions may also act or contribute to the RF signal interferences where heat and moisture may degrade RF signal quality.

The central cloud server 102 may be further configured to determine the set of intra-node RF beam parameters 522 and the set of inter-node RF beam parameters 524 for each of the plurality of hybrid analog-digital repeater devices 106 based on the first type of telemetry information 508 and the second type of telemetry information 510. The plurality of hybrid analog-digital repeater devices 106 may be disposed as a bi-directional RF bridge of data traffic between the master WAP device 104A and the one or more service WAP devices 108. The central cloud server 102 may be further configured to utilize the different types of telemetry information from the different types of network nodes, such as the plurality of hybrid analog-digital repeater devices 106 and WAP devices (the master WAP device 104A and the one or more service WAP devices 108) in the network to determine the set of intra-node RF beam parameters 522 and the set of inter-node RF beam parameters 524. The set of intra-node RF beam parameters 522 may be node-specific parameters that control the configuration and operation of the RF beams within a single hybrid analog-digital repeater device of the plurality of hybrid analog-digital repeater devices 106. The set of intra-node RF beam parameters 522 may optimize how each hybrid analog-digital repeater device may receive the donor signal and form the service beams to provide coverage within its surrounding area. The set of inter-node RF beam parameters 524 may be the set of parameters that controls the RF beam characteristics for the wireless links between two or more neighboring hybrid analog-digital repeater devices that form the wireless backhaul mesh network.

In accordance with an embodiment, the set of intra-node RF beam parameters 522 comprises two or more of: a phase shifting configuration for a donor antenna 220 and one or more service phased antenna arrays 222A, 222B, and 222C of each of the plurality of hybrid analog-digital repeater devices 106, azimuth and elevation angles of one or more service beams of RF signals from the one or more service phased antenna arrays 222A, 222B, and 222C, a beam width of the one or more service beams of RF signals, a modulation scheme of the one or more service beams of RF signals, a beam gain of the one or more service beams of RF signals, a polarization type of a donor beam of RF signal and the one or more service beams of RF signals, and an intermediate frequency selection parameter for the donor beam of RF signal and the one or more service beams of RF signals at each of the plurality of hybrid analog-digital repeater devices 106.

In an implementation, for the donor antenna 220, if the vibration information in the first type of telemetry information 508 indicates a vibration rate (e.g., high vibrations) greater than a threshold rate, the central cloud server 102 may be further configured to predict a misalignment of the donor antenna 220 in an upcoming time period. The central cloud server 102 may be further configured to determine and communicate an adjusted phase shifting configuration of the donor antenna 220 to compensate for the misalignment.

In an implementation, for the one or more service phased antenna arrays 222A, 222B, and 222C, if the battery power level indicates that one or more hybrid analog-digital repeater devices of the plurality of hybrid analog-digital repeater devices 106, may be running low on power, the beam gain and transmit power for service beams from the one or more service phased antenna arrays 222A, 222B, and 222C may be temporarily reduced to conserve energy. Further, if the first type of telemetry information 508 indicates hardware issues on specific antenna arrays of the one or more service phased antenna arrays 222A, 222B, and 222C, the central cloud server 102 may be configured to cause deactivation of those specific antenna arrays while re-optimizing and re-configuring remaining antenna arrays using new angles, beam patterns etc.

In an implementation, the azimuth and elevation angles of one or more service beams of RF signals from the one or more service phased antenna arrays 222A, 222B, and 222C may be determined by synergistically combining the first type of telemetry information 508 and the second type of telemetry information 510. For example, from the first type of telemetry information 508, the antenna array orientation change information may provide the baseline orientation of the one or more service phased antenna arrays 222A, 222B, and 222C, on each of the plurality of hybrid analog-digital repeater devices 106. Further, the vibration information may indicate potential temporary misalignments that need to be compensated for in the beam angles. From the second type of telemetry information 510, the location data associated with each UE of the one or more UEs connected to the corresponding wireless access point may provide a map of user distribution in the coverage area. Further, low RSSI from UEs in certain zones may indicate that those areas need better angular coverage from the service beams. Furthermore, poor performance from UEs in certain locations may further highlight zones requiring more focused beam coverage. The central cloud server 102 may be further configured to acquire the known orientation of each service antenna array of the one or more service phased antenna arrays 222A, 222B, and 222C and overlay the UE location data the second type of telemetry information 510 to identify high density user zones that need prioritized coverage. Thereafter, the central cloud server 102 may be further configured to determine the azimuth or elevation adjustments needed to steer beams from each service antenna array of the one or more service phased antenna arrays 222A, 222B, and 222C towards these priority zones. The central cloud server 102 may be further configured to check for UEs with poor RSSI or throughput outside the high-density areas, which may need additional beams steered their way. Thereafter, the central cloud server 102 may be further configured to determine any temporary misalignments based on the vibration information from the first type of telemetry information 508 to compensate the calculated beam angles. Thereafter, the final optimized azimuth and elevation angles balancing coverage of high-density areas while not leaving poor zones unserved may then be communicated as the set of intra-node RF beam parameters 522. Thus, the antenna orientation data may be combined with the UE locational performance data, adjusting the beam angles dynamically to concentrate RF energy towards the areas requiring maximum service at that point. The vibration data allows compensating for any temporary misalignments.

In an implementation, the central cloud server 102 may be further is configured to dynamically determine the optimal modulation scheme for the service beams transmitted by each hybrid analog-digital repeater device by analyzing the first type of telemetry information 508 and the second type of telemetry information 510. UEs with higher SINR values may be identified as candidates for higher order modulation schemes like 256-QAM to maximize throughput. However, if a UE is experiencing high errors despite having an apparently good SINR, the central cloud server 102 may instead configure a more robust, lower order modulation scheme like QPSK or 16-QAM for that UE's service beam. This accounts for potential signal quality degradations caused by factors like vibrations, shocks or antenna misalignments. The central cloud server 102 may be configured to maximize the throughput for each UE by configuring the highest modulation scheme that the SINR can reliably sustain, while using more robust modulations in lower SINR regions or for UEs experiencing performance issues. Alternatively stated, different modulation schemes may be configured concurrently across the multiple service beams based on the prevalent conditions for each UE.

In accordance with an embodiment, by analyzing the first type of telemetry information 508 and the second type of telemetry information 510, the central cloud server 102 may be further configured to set the beam gain separately for each service beam to prioritize gain towards high UE density areas (UE density area greater than a defined density) while reducing interference elsewhere (i.e., low UE density areas). The central cloud server 102 may be further configured to adjust the type of polarization for the donor beam reception to minimize cross-polarized interference detected by each hybrid analog-digital repeater device itself. The central cloud server 102 may be further configured to configure alternating polarizations (slant-horizontal/slant-vertical) across the service beams to reduce self-interference. The central cloud server 102 may be further configured to temporarily increase beam gain if UE RSSI is below a threshold RSSI (i.e., very low) due to a detected repeater orientation issue.

In an implementation, the central cloud server 102 may be further is configured to determine the intermediate frequency selection parameter, which may determine the specific frequency channel used for the donor beam received and the service beams transmitted by each hybrid analog-digital repeater device of the plurality of hybrid analog-digital repeater devices 106. The central cloud server 102 may be further configured to monitor the channel utilization and interference level reported by UEs on the current frequency channel. If utilization or interference crosses a threshold, indicating congestion/noise, such channel may be avoided. The central cloud server 102 may be further configured to check for high repeater device vibrations that could indicate temporary external interferers in the environment and further may analyze throughput and latency to see if the current frequency is unable to meet performance requirements. If any of these indicators from the first type of telemetry information 508 and the second type of telemetry information 510 indicate issues with the current frequency channel, the central cloud server 102 may identify an alternate intermediate frequency channel available in that area based on its channel mapping data and may set the alternate intermediate frequency as a parameter for that repeater's donor beam reception and service beam transmission. If temperature and hardware issues are detected in one or more of the plurality of hybrid analog-digital repeater devices 106, the central cloud server 102 may further block such hybrid analog-digital repeater devices from using frequencies in certain ranges. Thus, by monitoring the frequency channel quality and performance based on a fusion of dedicated repeater telemetry (i.e., the first type of telemetry information 508) and crowdsourced UE and WAP telemetry (i.e., the second type of telemetry information 510), the central cloud server 102 may dynamically switch the intermediate frequency parameter per repeater to hop to cleaner channels as required. This ensures reliable coverage while avoiding interference and congestion.

In accordance with an embodiment, the set of inter-node RF beam parameters 524 may comprise an activate-deactivate state control parameter indicative of which service phased antenna array of the one or more service phased antenna arrays of each of the plurality of hybrid analog-digital repeater devices 106 to activate or deactivate at a given timepoint for firing of a corresponding beam of RF signal at the given timepoint to one or more downstream neighboring nodes. The activate-deactivate state control parameter in the set of inter-node RF beam parameters 524 may allow the central cloud server 102 to dynamically activate or deactivate service antenna arrays on each hybrid analog-digital repeater device at any given time point. This enables flexible resource allocation by powering on only the arrays and corresponding beams required for downstream routing, providing benefits like reduced interference, improved energy efficiency, load balancing across the wireless backhaul mesh network, and redundancy in case of faults.

In accordance with an embodiment, the set of inter-node RF beam parameters 524 may further comprise a beam direction associated with each service beam of RF signals to be communicated from a given service phased antenna array activated based on the activate-deactivate state control parameter. The beam direction parameter in the set of inter-node RF beam parameters 524 may define the azimuth and elevation angles for each service beam transmitted by an activated antenna array towards specific downstream nodes in the wireless backhaul mesh network. This enables precise directional beamforming for maximizing link budget while minimizing interference, adapting beam directions as the mesh topology changes, and enabling advanced beamforming techniques for performance optimization.

In accordance with an embodiment, the set of inter-node RF beam parameters 524 may further comprise a specific beam transmit power selected for each service beam of RF signals transmitted at the given timepoint to the one or more downstream neighboring nodes. The specific beam transmit power parameter allows setting an optimized power level for each individual service beam towards downstream nodes based on the path loss, interference conditions etc. This enables link budget optimization while minimizing overall power consumption and interference footprint across the directional wireless backhaul mesh network architecture through judicious variable-power beam pattern design or configuration as compared to omni-powered mesh links. The power levels may be dynamically altered by the central cloud server 102 based on current RSSI, interference, congestion conditions continually reported through the first type of telemetry information 508 and the second type of telemetry information 510.

In accordance with an embodiment, the set of inter-node RF beam parameters 524 may further comprise a specific beam pattern selected for each service beam of RF signals transmitted at the given timepoint to the one or more downstream neighboring nodes. The set of inter-node RF beam parameters 524 may further comprise a list of different beam routing paths for the wireless backhaul network. This parameter allows configuring a specific beam pattern tailored for each individual service beam transmitted towards downstream nodes in the wireless backhaul mesh network. Additionally, it includes maintaining a list of different available beam routing paths across this wireless backhaul mesh network. For example, if the backhaul topology changes due to additions or any UE movement, beam patterns can be dynamically adjusted by the central cloud server 102 and data traffic may be re-routed via alternate paths in case of congestion, outages or changing conditions on certain backhaul links.

In accordance with an embodiment, the central cloud server 102 may be further configured to assign a different weightage to the first type of telemetry information 508 obtained from the plurality of hybrid analog-digital repeater devices 106 with respect to the second type of telemetry information 510 obtained from the master WAP device 104A and the one or more service WAP devices 108 in the determination of the set of intra-node RF beam parameters 522 and the set of inter-node RF beam parameters 524. By assigning different weightages, central cloud server 102 may prioritize one telemetry source over the other depending on the specific beam parameter being optimized. For example, when determining the set of intra-node RF beam parameters 522 (e.g., parameters like phase configurations and beam angles of the donor and service antennas), higher weightage to the repeater's own orientation and vibration information of the first type of telemetry information 508 may be useful to account for any misalignments more accurately than just relying on UE reports in the second type of telemetry information 510. Conversely, for the inter-node RF beam parameters 524 about beam directions towards neighboring nodes, the second type of telemetry information 510 with UE location data may be prioritized over the first type of telemetry information 508. Further, for certain hybrid analog-digital repeater devices of the plurality hybrid analog-digital repeater devices 106, reporting hardware degradations or failures in the first type of telemetry information 508, their weightage may be reduced while the beam parameters are optimized based more on surrounding nodes telemetry information and/or the second type of telemetry information 510 to maintain coverage. The weighted approach allows optimally combining dedicated node-level telemetry with crowd-sourced spatial UE intelligence for reliable, self-healing, user-focused, and context-aware beam configuration, thereby providing resilience and high performance across the entire backhaul mesh network.

The central cloud server 102 may be further configured to cause the plurality of hybrid analog-digital repeater devices 106 to dynamically form a wireless backhaul mesh network among the master WAP device 104A, the plurality of hybrid analog-digital repeater devices 106 and the one or more service WAP devices 108, based on the determined set of intra-node RF beam parameters 522 and the set of inter-node RF beam parameters 524. The central cloud server 102 may be further configured to communicate the set of intra-node RF beam parameters 522 and the set of inter-node RF beam parameters 524 to each hybrid analog-digital repeater device over the WLAN mesh backchannel network 128 for control and configuration purposes. Each of the plurality of hybrid analog-digital repeater devices 106 may then dynamically adjust their internal phase shifter settings and other parameters as per the received set of intra-node RF beam parameters 522. Concurrently, the plurality of hybrid analog-digital repeater devices 106 may coordinate their inter-node beams towards neighboring nodes based on the set of inter-node RF beam parameters 524 to establish the multi-hop backhaul mesh topology. This dynamic centralized coordination combined with the localized enactment by the repeater nodes allows rapidly forming and re-configuring the resilient backhaul fabric in an automated manner.

In accordance with an embodiment, the central cloud server 102 may be further configured to cause the plurality of hybrid analog-digital repeater devices 106 to establish one or more analog data propagation paths in the wireless backhaul mesh network in one or more intermediate frequencies and further establish a backchannel network (e.g., the WLAN mesh backchannel network 128) in the control plane 124 in the wireless backhaul mesh network via a wireless local area network (WLAN) frequency less than the one or more intermediate frequencies. The central cloud server 102 is further configured to establish a multi-layer wireless backhaul mesh network architecture across the plurality of hybrid analog-digital repeater devices 106, the master WAP device 104A, and the one or more service WAP devices 108. A first layer may include the one or more analog data propagation paths operating in intermediate radio frequency bands (e.g., mmWave frequencies or 60 GHZ) to relay high-bandwidth data payloads. The one or more analog data propagation paths may be dynamically formed by configuring the plurality of hybrid analog-digital repeater devices 106 to generate steerable RF beams in conformance with the set of intra-node RF beam parameters 522 and the set of inter-node RF beam parameters 524 computed by the central cloud server 102. This enables a self-organizing mesh topology of high-throughput analog links across the multi-hop backhaul segment. Concurrently, a second control plane layer may be instantiated as a lower frequency digital backchannel leveraging wireless local area network (WLAN) technologies operating at carrier frequencies below the intermediate frequencies employed for the analog data propagation paths. The digital backchannel (e.g., the WLAN mesh backchannel network 128) may be established between the central cloud server 102 and the plurality of hybrid analog-digital repeater devices 106 to facilitate out-of-band signaling and telemetry exchange while providing a hardened management interface resilient to the dynamics impacting the primary high-frequency payload channels.

In accordance with an embodiment, the central cloud server 102 may be further configured to re-configure the one or more analog data propagation paths in the wireless backhaul mesh network when the second type of telemetry information 510 indicates a performance change beyond a defined performance range. The central cloud server 102 may continuously monitor the second type of telemetry information 510, which may include real-time wireless link metrics, sensor data, and interference levels across the backhaul network. Based on the analysis of the second type of telemetry information 510, using the neural network model 102B, the central cloud server 102 may be configured to detect if any key performance indicators deviate beyond defined thresholds, indicating a change that may warrant reconfiguration, such as degraded signal quality, predicted blockages from the computer vision, or increased external interference. Upon detecting such events, the central cloud server 102 may recompute the set of intra-node RF beam parameters 522 and the set of inter-node RF beam parameters 524 to mitigate the issue. These updated beam steering vectors, routing paths, and power levels re-computed may then be transmitted to the relevant hybrid analog-digital repeater devices over the digital backchannel. This also helps overcome the LoS interferences. The relevant hybrid analog-digital repeater devices may then dynamically reconfigure their phase shifters and beamforming hardware according to these new parameters, thereby re-establishing high-throughput, resilient analog data propagation paths autonomously while adapting to the changing environment and load conditions.

In an implementation, the central cloud server 102 by use of the neural network model 102B may process the surrounding-environment sensed information, such as visual data, Lidar sensor data, and motion tracking data, to identify potential environmental factors that may impact the performance or cause failure of one or more network nodes of the plurality of network nodes. For example, if the motion tracking data indicates that a network node has been physically moved or the visual data shows obstructions near the network node, the neural network model 102B may be configured to interpret such factors as potential risks for interference, blockage, or failure. Furthermore, the neural network model 102B may be configured to analyze the vibration information and antenna array orientation changes to detect patterns or anomalies that may lead to performance issues or failures. If the vibration information exceeds a certain threshold or the antenna orientation changes for a particular network node, the neural network model 102B may be configured to recognize these anomalies as potential precursors to performance degradation or failure.

In an implementation, the central cloud server 102 by use of the neural network model 102B may be further configured to analyze the second type of telemetry information 510 (UE-related information), such as throughput, latency, packet loss, and channel utilization, to identify patterns or anomalies that may indicate performance degradation or potential interference of the different types of wireless access point devices (i.e., the master WAP device 104A and the one or more service WAP devices 108). For example, if the throughput and latency for UEs connected to a particular access point start to degrade consistently, or if the packet loss and channel utilization levels exceed certain thresholds, the neural network model 102B may be configured to recognize these patterns as early warning signs of potential performance issues or failure of that access point. The neural network model 102B may be trained on historical data and known failure scenarios associated with the different types of telemetry information. By continuously learning from past incidents and analyzing the combination of the first type of telemetry information 508 and the second type of telemetry information 510, the neural network model 102B may identify complex patterns, anomalies, or trends that may indicate an impending node failure or performance degradation beyond a defined threshold.

In accordance with an embodiment, in certain scenarios, it is experimentally observed that the combination of the first type of telemetry information 508 and the second type of telemetry information 510 may provide more accurate prediction than one type of telemetry information alone. In a first example, potential failure due to environmental factors and network congestion may be predicted by the central cloud server 102. In this example, the neural network model 102B may analyze the combination of the following telemetry data. a) the first type of telemetry information 508, which in this may include the environmental sensor data from multiple hybrid analog-digital repeater devices in a specific area, indicating a sudden increase in temperature and humidity levels, and the antenna array orientation change information from a subset of the multiple hybrid analog-digital repeater devices in the specific area devices, suggesting a slight tilt in their orientation; b) the second type of telemetry information 510, which in this case may include UE-related information from wireless access point devices connected to the affected hybrid analog-digital repeater devices, showing a significant increase in channel utilization and a decrease in throughput for connected UEs. By analyzing this combination of the first type of telemetry information 508 and the second type of telemetry information 510 telemetry data, the neural network model 102B may synergistically identify a pattern that suggests potential failure or significant performance degradation of the affected hybrid analog-digital repeater devices and the associated wireless access point devices. The neural network model 102B may correlate the sudden increase in temperature and humidity levels with the slight tilt in antenna orientation, indicating potential environmental factors (e.g., strong winds or a small-scale weather event) affecting the devices' performance. Additionally, the increased channel utilization and decreased throughput for connected UEs may be indicative of potential network congestion and degraded performance due to the environmental factors.

In a second example, a potential performance degradation of the service WAP device 108A may be detected by synergistic combination of the first type of telemetry information 508 and the second type of telemetry information 510. The neural network model 102B may analyze the combination of the following telemetry data: a) the first type of telemetry information 508, which in this case may include vibration information from a specific hybrid analog-digital repeater device indicating excessive vibrations beyond a defined threshold; and b) the second type of telemetry information 510 from the service WAP device 108A may indicate UE-related information from the service WAP device 108A connected to the specific hybrid analog-digital repeater device, may indicate an increase in interference levels and retransmission/error rates for connected UEs. By analyzing the combination of excessive vibrations detected by the hybrid analog-digital repeater device and the increased interference levels and error rates experienced by UEs connected to the associated service WAP device 108A, the neural network model 102B may identify a pattern that may indicate potential performance degradation of the wireless access point device due to the vibrations affecting the signal quality and interference levels. If only the first type of telemetry information 508 was analyzed, the excessive vibrations might be interpreted as a localized issue with the hybrid analog-digital repeater device itself. Similarly, if only the second type of telemetry information 510 was considered, the increased interference and error rates could be attributed to various other factors, such as network congestion or environmental interference. However, by combining both types of telemetry information, the central cloud server 102 using the neural network model 102B may correlate the excessive vibrations with the degraded performance experienced by connected UEs, enabling it to predict the potential performance degradation of the service WAP device 108A due to the impact of vibrations on the signal quality and interference levels. Thus, the combination of the first type of telemetry information 508 and the second type of telemetry information 510 provides a more comprehensive view of the network conditions and enables the neural network model 102B to identify complex patterns and correlations that may not be apparent when analyzing either type of telemetry information in isolation.

In accordance with an embodiment, the synergistic combination of the first type of telemetry information 508 and the second type of telemetry information 510 provides several benefits. In a first example, if a given hybrid analog-digital repeater device's orientation data shows a change of a 10° tilt, but the one or more UEs in area report low RSSI, the set of inter-node RF beam parameters 524 may adjust the service beam angles and gains to compensate the low RSSI. In a second example, if a data propagation path among the plurality of hybrid analog-digital repeater devices 106 indicate a high UE throughput (greater than the threshold throughput) but high packet errors, more robust modulation like QPSK could be used instead of 16-QAM to increase robustness. In a third example, if one or more hybrid analog-digital repeater devices detects high interference (greater than a threshold interference) from a specific direction based on UE reports, the central cloud server 102 may be configured to cause the one or more hybrid analog-digital repeater devices to enable a beam pattern that minimizes gain in that direction through nulling. Further, with respect to the donor antenna 220, if the interference level from UEs indicates high interference on the donor signal frequency, the polarization type parameter for the donor beam may be changed to an orientation that may minimize and/or mitigate interference.

Based on the first type of telemetry information 508 and the second type of telemetry information 510, determine an RF signal interference or blockage on the first type of polarization 118A corresponding to the first analog data link 118 of the dual analog data links 118 and 120 at one or more hybrid analog-digital repeater devices of the plurality of hybrid analog-digital repeater devices 106. Interference and blockages may occur due to various factors, such as competing wireless networks, physical obstructions, or environmental conditions. By continuously monitoring the different types of telemetry information from the plurality of hybrid analog-digital repeater devices 106 and the WAPs (i.e., the master WAP device 104A and the one or more service WAP devices 108), the central cloud server 102 may promptly detect any degradation in signal quality or link performance. This enables the wireless communication system 100A or 100C to take timely corrective actions, such as dynamic polarization switching or adaptive routing, to mitigate the impact of interference or blockage and ensure uninterrupted data transmission. The combination of the first type of telemetry information 508 (from the plurality of hybrid analog-digital repeater devices 106) and the second type of telemetry information 510 (from the master WAP device 104A and the one or more service WAP devices 108) may provide a more comprehensive and reliable approach to detecting and determining the RF signal interference or blockage on the first type of polarization 118A as compared to using just one type of telemetry information. For example, the combination of different types of telemetry information allows the central cloud server 102 to cross-validate and correlate the data received from different sources. For example, if the first type of telemetry information 508 indicates a deterioration in signal strength or an increase in interference levels in a specific area of the network, the central cloud server 102 can validate this information by checking the corresponding second type of telemetry information 510 from the affected one or more service WAP devices 108 in that area. By correlating the data from both types of telemetry information, the central cloud server 102 may identify patterns, anomalies, or trends that may not be apparent when analyzing just one type of telemetry information in isolation. For instance, if the second type of telemetry information 510 indicates a gradual increase in latency or packet loss for UEs connected to the master WAP device 104A, the central cloud server 102 may proactively investigate the issue by analyzing the corresponding first type of telemetry information 508 from the hybrid analog-digital repeater devices 106A in the vicinity. By detecting performance degradation early, the central cloud server 102 may take proactive measures, such as load balancing, network reconfiguration, or preventive maintenance, to mitigate the impact on the network and user experience. Furthermore, the combination of the different types of telemetry information may enable the central cloud server 102 to identify the root causes of performance degradation more effectively. For example, if the first type of telemetry information 508 indicates a sudden increase in interference levels or a change in environmental factors (e.g., temperature, humidity) in a specific area, the central cloud server 102 can correlate this information with the second type of telemetry information 510 from the affected master WAP device 104A and service WAP devices 108 to determine the potential cause of the performance degradation. By identifying the root causes, the central cloud server 102 may perform targeted actions to address the issue and prevent future occurrences with improved accuracy and reliability.

In accordance with an embodiment, the central cloud server 102 may be further configured to dynamically switch the data traffic at the one or more hybrid analog-digital repeater devices (e.g., the hybrid analog-digital repeater device 106B) on the second type of polarization 120A corresponding to the second analog data link 120 of the dual analog data links 118 and 120 when an RF signal interference or blockage is determined on the first type of polarization 118A corresponding to the first analog data link 118 at the one or more hybrid analog-digital repeater devices (e.g., the hybrid analog-digital repeater device 106B). Each of the plurality of hybrid analog-digital repeater devices 106, equipped with dual analog data links 118 and 120, while operating on two different polarizations, may continuously monitor the signal quality and interference levels on both polarizations. When one polarization experiences excessive interference or blockage, signal degradation may be detected and communicated to the central cloud server 102. Acting as the central controller, the central cloud server 102 may dynamically instruct the affected one or more hybrid analog-digital repeater devices (e.g., the hybrid analog-digital repeater device 106B) to switch the data traffic from the impaired polarization to the other polarization. The one or more hybrid analog-digital repeater devices may then seamlessly transition the data transmission, ensuring uninterrupted communication. This situation may arise in dense urban environments where numerous obstacles and competing wireless networks can cause signal degradation. By promptly switching to the other polarization, the wireless communication system 100A may maintain a reliable and stable connection between the repeater devices and their neighboring nodes, ensuring the continuity of critical data flows and minimizing the impact on end-users.

In accordance with an embodiment, in order to determine the RF signal interference or blockage, the central cloud server 102 may be further configured to cause the plurality of hybrid analog-digital repeater devices 106 to extract at least a reference signal, channel state information, or signal quality metrics independently from the first type of polarization 118A and the second type of polarization 120A at each of the plurality of hybrid analog-digital repeater devices 106. The reference signals, such as pilot tones or known sequences injected by the master WAP device 104A, may enable assessing the quality and strength of the received signal. The channel state information may provide insights into the current conditions of the wireless channel, including any interference or distortions. The signal quality metrics, such as signal-to-noise ratio (SNR), bit error rate (BER), or received signal strength indicator (RSSI), may provide quantitative measurements of the link performance. By extracting this information separately for each polarization at each hybrid analog-digital repeater device, the central cloud server 102 may obtain a detailed and comprehensive view of the network's RF environment.

In accordance with an embodiment, the central cloud server 102 may be further configured to utilize the reference signal to predict the location and movement of the interferers or blockers in the wireless backhaul mesh network. By continuously monitoring the reference signal and analyzing its changes over time and space, the wireless communication system 100A and 100C may effectively detect and mitigate the impact of interferers or blockers using an interference tracking operation. In the interference tracking operation, initially, the central cloud server 102 may be further configured to set an initial beam direction and a power level of each transmit (Tx) or receive (Rx) beam at each of the plurality of hybrid analog-digital repeater devices 106. Thereafter, the central cloud server 102 may be further configured to monitor the reference signal at a plurality of different locations over time for the plurality of hybrid analog-digital repeater devices 106. In other words, the strength and quality of the reference signal may be measured at multiple locations. The central cloud server 102 may be further configured to detect an interferer or a blocker in a specific area across the wireless backhaul mesh network when a signal metric of the reference signal is dropped beyond a defined threshold at a given location of the plurality of different locations. In other words, when significant changes in the reference signal are detected at multiple points or locations, it indicates the likely presence of an interferer in the area. Further, the central cloud server 102 may estimate the location of the interferer based on the observed changes in the reference signal. Furthermore, by analyzing the interferer's estimated location and its previous movement patterns, the central cloud server 102 may predict its future trajectory. This predictive capability allows to proactively adjust the beamforming and power levels of the one or more hybrid analog-digital repeater devices affected by the RF signal interference, effectively steering the beams away from the interferer and minimizing its impact on the network. In some cases, the central cloud server 102 may adapt the mesh configuration to optimize performance in the presence of interferers. This could involve strategically adding new repeaters or dynamically adjusting the routing of traffic to circumvent the affected areas. The interference tracking operation may continuously iterate, monitoring the reference signal, detecting changes, estimating interferer location, predicting movement, and adjusting the network parameters in real-time. The ability to predict and proactively mitigate interference enables reliable wireless connectivity in challenging environments.

In accordance with an embodiment, the central cloud server 102 may predict and mitigate interference in the wireless backhaul mesh network using the reference signal. By monitoring the quality of the reference signal, the central cloud server 102 server may infer the presence of interference when a decrease in signal quality is detected. It may then activate various features, such as utilizing one of the polarizations of the first type of polarization 118A or the second type of polarization 120A to search for the interference source, while leveraging data from set of onboard sensors 224 on each hybrid analog-digital repeater to identify potential causes like buildings, trees, or vehicles. Once the interference source is pinpointed, the central cloud server 102 may take proactive mitigation steps, such as adjusting the phase array antenna patterns to steer beams away from the interferer, optimizing signal power levels, or adapting the mesh configuration to reroute traffic and avoid affected areas.

Furthermore, the central cloud server 102 may utilize the reference signal in various ways to optimize and enhance the performance, robustness, and reliability of the wireless mesh network. It may leverage the reference signal to assess the quality of the signal across the wireless backhaul mesh network at different network nodes, enabling the identification and mitigation of interference while optimizing the beamforming and power levels of the repeaters. The reference signal may also be used to measure the delay through each link, allowing for the optimization of the overall network latency. Additionally, the central cloud server 102 may employ the reference signal to determine whether a beam is reflected beam or a line-of-sight, facilitating the optimization of beamforming, power levels, and overall network reliability. Moreover, the central cloud server 102 may dynamically adapt the routing of traffic based on the reference signal to mitigate the impact of interferences or blockages and other network issues. Finally, the reference signal may be employed for comprehensive network monitoring and problem diagnosis.

In accordance with an embodiment, the central cloud server 102 may be further configured to identify and quantify polarization-dependent impairments affecting one type of polarization higher than other type of polarization based on comparative analysis of the reference signal, the channel state information, or the signal quality metrics across two types of polarizations. By extracting and analyzing the reference signal, channel state information, and signal quality metrics independently for each polarization at every hybrid analog-digital repeater device, the central cloud server 102 may gain a comprehensive understanding of the network's RF environment. It can then compare the metrics between the two polarizations to identify any discrepancies or anomalies that indicate the presence of polarization-dependent impairments. For example, if the signal quality metrics, such as signal-to-noise ratio (SNR) or bit error rate (BER), are consistently worse for one polarization compared to the other across multiple repeater devices, it suggests that the affected polarization is experiencing higher levels of impairment. Similarly, if the channel state information reveals distinct propagation characteristics or interference patterns for one polarization, it indicates the existence of polarization-specific issues. By quantifying the extent of the polarization-dependent impairments, the central cloud server 102 can make informed decisions on how to optimize the network's performance. It may instruct the repeater devices to prioritize the polarization with better signal quality for critical data transmission while utilizing the impaired polarization for less sensitive traffic or for conducting further analysis to identify the root cause of the impairment. In severe cases, the central cloud server 102 may even decide to temporarily disable the impaired polarization or use it for scanning purposes and may rely solely on the other polarization until the issue is resolved.

In accordance with an embodiment, the central cloud server 102 may be further configured to cause the plurality of hybrid analog-digital repeater devices 106 to execute a first beam sweep in an azimuth plane in a defined step angle size covering 0° to 360° azimuth angular span with a defined stop dwell time at each of the defined step angle size. The central cloud server 102 may be further configured to detect one or more specific suspect directions of interferers by tuning the defined step angle size or the defined stop dwell time. At each defined step angle size, each of the plurality of hybrid analog-digital repeater devices 106 may pause the beam rotation for a specified dwell time, for example, around 50 milliseconds. During this brief pause, each of the plurality of hybrid analog-digital repeater devices 106 may acquire and process data related to the signal quality, interference levels, and other relevant metrics in that specific direction. The central cloud server 102 then aggregates and analyzes the data from all the hybrid analog-digital repeater devices to create a comprehensive map of the RF environment. By examining the collected data, the central cloud server 102 may identify specific suspect directions where interferers may be present. It achieves this by intelligently tuning the step angle size using the step angle size tuner 514A and the stop dwell time using the stop dwell time tuner 514B based on the initial findings. For example, if a particular angular region exhibits higher levels of interference, the central cloud server 102 may instruct the relevant affected hybrid analog-digital repeater devices to perform a more focused beam sweep in that region with a smaller step angle size and longer dwell times. This adaptive approach allows for a more detailed analysis of the suspect areas, enabling the accurate localization of interferers. The beam sweeping technique, combined with the intelligent tuning of the step angle size and stop dwell time, empowers the central cloud server 102 to proactively detect and locate interferers in the network.

In accordance with an embodiment, the central cloud server 102 may be further configured to cause the plurality of hybrid analog-digital repeater devices 106 to execute a second beam sweep in an elevation plane in a defined step angle size spanning angles from −90° to +90° relative to an azimuth plane with a defined stop dwell time at each of the defined step angle size to pause at each angular position. The central cloud server 102 may be further configured to detect one or more specific suspect directions of interferers by tuning the defined step angle size or the defined stop dwell time. Upon concluding the 360° azimuth sweep, the central cloud server 102 may initiate a beam sweep sequence along the elevation plane spanning angles from −90° to +90° relative to the horizontal plane, for example, in adaptive 10° vertical steps pausing, for example, for 50 milliseconds at each angular position. For example, if a particular elevation angle exhibits higher levels of interference, the central cloud server 102 may instruct the plurality of hybrid analog-digital repeater devices 106 to perform a more focused beam sweep in that region with a smaller step angle size and longer dwell times. This adaptive approach allows for a more detailed analysis of the suspect areas, enabling the accurate localization of interferers in the vertical plane. The combination of the azimuth plane and elevation plane beam sweeps provides the central cloud server 102 with a comprehensive 3D map of the RF environment. By analyzing the data from both sweeps, the central cloud server 102 may pinpoint the location of interferers not only in terms of their horizontal direction but also their vertical position. This information is useful for optimizing the network's performance and mitigating the impact of interferers.

In accordance with an embodiment, the central cloud server 102 may be further configured to identify a direction and a location of the RF signal interference or blockage based on the first type of telemetry information 508 and the second type of telemetry information 510. In a first scenario, for example, in the type of telemetry information 508, each of the plurality of hybrid analog-digital repeater devices 106 may report signal strength measurements for each wireless link. In the second type of telemetry information 510, the master WAP device 104A and the one or more service WAP devices 108 may provide signal strength data for the client devices (e.g., UEs) connected to them. The central cloud server 102 may analyze the signal strength data from multiple hybrid analog-digital repeater devices and access points. By comparing the signal strengths across different devices and correlating them with their known locations, the central cloud server 102 may triangulate the approximate position of the interference or blockage source. For example, if several repeater devices in a specific area report significantly lower signal strengths compared to other regions, it indicates the presence of interference or blockage in that area. In a second scenario, for example, the central cloud server 102 may perform beam sweeping and signal quality analysis. In the first type of telemetry information 508, each of the plurality of hybrid analog-digital repeater devices 106 may perform beam sweeping in the azimuth and elevation planes and report signal quality metrics, such as signal-to-noise ratio (SNR) or received signal strength indicator (RSSI), for each angle. In the second type of telemetry information 510, the master WAP device 104A and the one or more service WAP devices 108 may provide signal quality data for the client devices (UEs) connected to them. The central cloud server 102 may analyze the signal quality metrics obtained during the beam sweeps performed by the plurality of hybrid analog-digital repeater devices 106. By identifying the angles with significantly degraded signal quality, the central cloud server 102 may determine the specific direction of the interference or blockage. Additionally, by correlating this information with the signal quality data from the access points, the central cloud server 102 may further refine the estimated location of the impairment.

In accordance with an embodiment, the central cloud server 102 may be further configured to apply the neural network model 102B to mitigate an impact of the RF signal interference or blockage on the wireless backhaul mesh network by communicating a set of control instructions to the one or more hybrid analog-digital repeater devices (e.g., the hybrid analog-digital repeater device 106B) affected by the RF signal interference or blockage in the wireless backhaul mesh network. The set of control instructions may cause the one or more hybrid analog-digital repeater devices to further adjust one or more of an antenna radiation pattern, a channel frequency, a beam routing path, or control a transmit power level based on the first type of telemetry information 508 and the second types of telemetry information 510. The neural network model 102B may be configured to process the first type of telemetry information 508 and the second type of telemetry information 510 to identify patterns or correlations that indicate the presence and impact of interference or blockage. Based on the analysis, the neural network model 102B may be configured to generate control instructions that guide the affected repeater devices to make intelligent adjustments to mitigate the impairments. For example, by dynamically changing the shape and direction of the antenna beams, the one or more hybrid analog-digital repeater devices may steer the signals away from the sources of interference or blockage. Another control instruction may involve changing the channel frequency used by the affected repeater devices. If the interference is localized to specific frequency bands, the central cloud server 102 may instruct the one or more hybrid analog-digital repeater devices to switch to alternative channels that are less affected by the impairments. The neural network model 102B may also generate control instructions to optimize the beam routing paths within the wireless backhaul mesh network. By analyzing the different types of telemetry information, the neural network model 102B may be configured to identify alternative paths that bypass the regions affected by interference or blockage. The central cloud server 102 may then instruct the one or more hybrid analog-digital repeater devices to adapt their routing configurations, accordingly, ensuring that the data traffic is redirected through the most optimal and reliable paths. Furthermore, the control instructions may involve adjusting the transmit power levels of the affected repeater devices. By dynamically regulating the power levels based on the severity of the impairments, the central cloud server 102 may be configured to balance between maintaining sufficient signal strength and minimizing the impact of interference.

In accordance with an embodiment, the central cloud server 102 may be further configured to predict future blocker positions in the wireless backhaul mesh network based on the first type of telemetry information 508 including at least a surrounding-environment sensed information and historical blocker movement patterns. The central cloud server 102 may be further configured to proactively adjust beamforming patterns and beam routings in the wireless backhaul mesh network based on the predicted future blocker positions. The central cloud server 102 may be configured to predict future blocker positions in the wireless backhaul mesh network by utilizing a combination of historical data form the backhaul network training data lake 520 and a blockage prediction process that involves environment sensing, 3D environment mapping, object detection, and blocker identification. The historical data may include past blocker movement patterns and telemetry information, may be used to train the neural network model 102B. The neural network model 102B may then be employed to predict future blocker positions based on the current network state and the historical patterns learned during training. The environment sensing may be done using the set of onboard sensors 224, such as cameras, LiDAR, or radar sensors, which may continuously gather real-time data about the physical surroundings of the plurality of hybrid analog-digital repeater devices 106. This sensed information may be used to create and update a 3D environment map, providing a detailed representation of the network's operating environment. The object detection using one of the plurality of polarizations may process the sensed data and the 3D environment map to identify and classify objects in the vicinity of the plurality of hybrid analog-digital repeater devices 106. The central cloud server 102 may categorize objects such as buildings, trees, vehicles, or other potential blockers. The blocker identification operation may be performed to analyze the detected objects and their positions relative to the wireless links to determine which objects are likely to cause signal blockage. This information, along with the neural network model 102B predictions, may be used to estimate the current and future positions of blockers in the network. Based on the predicted blocker positions, the central cloud server 102 may proactively adjust beamforming patterns and beam routings in the wireless backhaul mesh network. The routing table of each of the plurality of hybrid analog-digital repeater devices 106 may be updated by the central cloud server 102 to adapt the network's routing configurations to steer traffic through unobstructed paths, while the antenna beams may be adjusted to avoid predicted blocker locations, ensuring optimal signal quality and connectivity. The central cloud server 102 may further perform link degradation analysis to continuously monitor the network links and assess the impact of blockers on link performance. This information may be fed back into the neural network model 102B training and blockage prediction processes to refine the blocker position predictions over time.

In accordance with an embodiment, the central cloud server 102 may be further configured to cause the one or more hybrid analog-digital repeater devices (e.g., the hybrid analog-digital repeater device 106B affected by the RF signal interference or blockage in the wireless backhaul mesh network) to execute the alternate beamforming weights 512 for each antenna element of the donor antenna 220 and one or more service phased antenna arrays 222A, 222B, and 222C of the one or more hybrid analog-digital repeater devices when the RF signal interference or blockage is determined on the first type of polarization 118A corresponding to the first analog data link 118 at the one or more hybrid analog-digital repeater devices. The alternate beamforming weights 512 may be a set of complex coefficients that are applied to the antenna elements of the donor antenna 220 and the service phased antenna arrays 222A, 222B, and 222C in the hybrid analog-digital repeater devices. The alternate beamforming weights 512 may be used to adjust the phase and amplitude of the signals fed to each antenna element, enabling the one or more hybrid analog-digital repeater devices to steer their antenna beams in a specific direction or pattern. The alternate beamforming weights 512 may be generated by the central cloud server 102 when it detects RF signal interference or blockage on the first type of polarization 118A, which corresponds to the first analog data link 118. The purpose of these weights is to mitigate the impact of the detected impairment by adjusting the antenna beam patterns of the affected repeater devices. The central cloud server 102 may calculate the alternate beamforming weights 512 based on various factors, such as: a) the location and characteristics of the detected interference or blockage; b) the current network conditions and the performance requirements of the affected links; c) the capabilities and constraints of the affected repeater devices, including the number of antenna elements and the available processing power; and d) the beam pattern and direction that would best mitigate the impact of the impairment while maintaining optimal network performance.

In accordance with an embodiment, the central cloud server 102 may be further configured to cause the one or more hybrid analog-digital repeater devices (affected by the interference) to generate a spatial null or a region of reduced signal strength in the direction of the RF signal interference or blockage based on the executed alternate beamforming weights 512. Upon receiving the alternate beamforming weights 512, the one or more hybrid analog-digital repeater devices (affected by the interference) may apply these weights to their antenna elements, adjusting the phase and amplitude of the signals fed to each element. By carefully controlling the relative phases and amplitudes of the signals, the one or more hybrid analog-digital repeater devices (affected by the interference) may destructively interfere with the signals coming from the direction of the interference or blockage, effectively creating a spatial null or a region of reduced signal strength in that direction. The central cloud server 102 may transmit the alternate beamforming weights 512 to the affected repeater devices via a control channel.

In accordance with an embodiment, the central cloud server 102 may be further configured to drop participation of the one or more hybrid analog-digital repeater devices when the RF signal interference or blockage is determined on both the first type of polarization 118A and the second type of polarization 120A at the one or more hybrid analog-digital repeater devices. The central cloud server 102 may be configured to take decisive action when RF signal interference or blockage is determined on both the first type of polarization 118A and the second type of polarization 120A at one or more hybrid analog-digital repeater devices. In such cases, the server may drop the participation of the affected repeater devices from the wireless backhaul mesh network. The central cloud server 102 may then dynamically reassign two or more network nodes previously connected to the one or more hybrid analog-digital repeater devices (affected by the interference or blockage) to neighboring network nodes of each of the two or more network nodes except the one or more hybrid analog-digital repeater devices, ensuring continuity of service and maintaining the overall network connectivity.

In accordance with an embodiment, the central cloud server 102 may be further configured to remotely monitor the performance of the plurality of hybrid analog-digital repeater devices 106 for early detection of any potential network issues, such as interference or blockages, and the rapid deployment of corrective actions communicated as updated configuration or in the form of the set of intra-node RF beam parameters 522 or the inter-node RF beam parameters 524. The central cloud server 102 may be further configured to update the firmware of the plurality of hybrid analog-digital repeater devices 106 in the network over the air. This allows for the rapid deployment of new features and bug fixes, without the need for manual intervention. The centralized controller, such as the central cloud server 102 may propagate configuration updates to individual nodes for localized enactment over the digital backchannel. This helps coordinate the multi-band topology with mmWave NR-U for capacity 5G access and Wi-Fi® 7 for reliable control.

In accordance with an embodiment, the central cloud server may be further configured to remotely boot the plurality of hybrid analog-digital repeater devices 106 and synchronize timing over the air, leverage dual polarization to inject test signals (reference signals), and analyze test metrics to calibrate configurations for each of the plurality of hybrid analog-digital repeater devices 106. Further, synchronizing timing references over the air from the central cloud server 102 may ensure precise timing alignment across the plurality of hybrid analog-digital repeater devices 106 in the distributed mesh architecture. Furthermore, leveraging dual polarization to inject reference signals (e.g. test synchronization signal block (SSB) signals) allows the central cloud server 102 to conduct comprehensive in-service testing and calibration of the active backhaul links without disrupting operational user traffic. By analyzing the test metrics obtained from the injected SSB signals, the central cloud server 102 may accurately measure and characterize the performance of each backhaul link. This test data feeds into the telemetry-driven analytics to continually fine-tune and recalibrate the intra-node and inter-node beam parameters for optimal backhaul operations. This ability to repeatedly test, measure and self-calibrate the backhaul links transforms the wireless mesh from a static deployment to a self-optimizing and self-healing architecture that can recover from disruptions or degradations by reconfiguring beam parameters based on the latest calibrated measurements from the central cloud server 102.

In accordance with an embodiment, the central cloud server 102 may be further configured to interlace licensed (5G) and unlicensed (Wi-Fi) RF in the wireless backhaul mesh network in the following ways, for example: a) licensed 5G frequencies may be used for one type of polarization and unlicensed Wi-Fi frequencies may be used for the other type of polarization. This may allow the system to leverage both licensed and unlicensed spectrum simultaneously; b) Further, the central cloud server 102, which obtain telemetry information and make decisions about switching traffic, may be programmed to dynamically allocate traffic between licensed 5G and unlicensed Wi-Fi bands based on interference, congestion, or other network conditions. The interference may include the RF signal interference or the LoS interference; c) Further, the ability to switch traffic between different polarizations when interference or blockage is detected may be further extended and used to switch between licensed and unlicensed bands. For example, if interference is detected on the licensed 5G frequency, the system could switch to the unlicensed Wi-Fi band for certain areas; d) Further, the wireless backhaul mesh network may use a combination of licensed 5G and unlicensed Wi-Fi frequencies to provide flexible and robust backhaul connections between the master WAP device 104A and the one or more service WAP devices 108; and e) lastly, by interlacing 5G and Wi-Fi, overall network capacity may be increased, using Wi-Fi to offload some traffic from the 5G network when appropriate.

Figure 6:
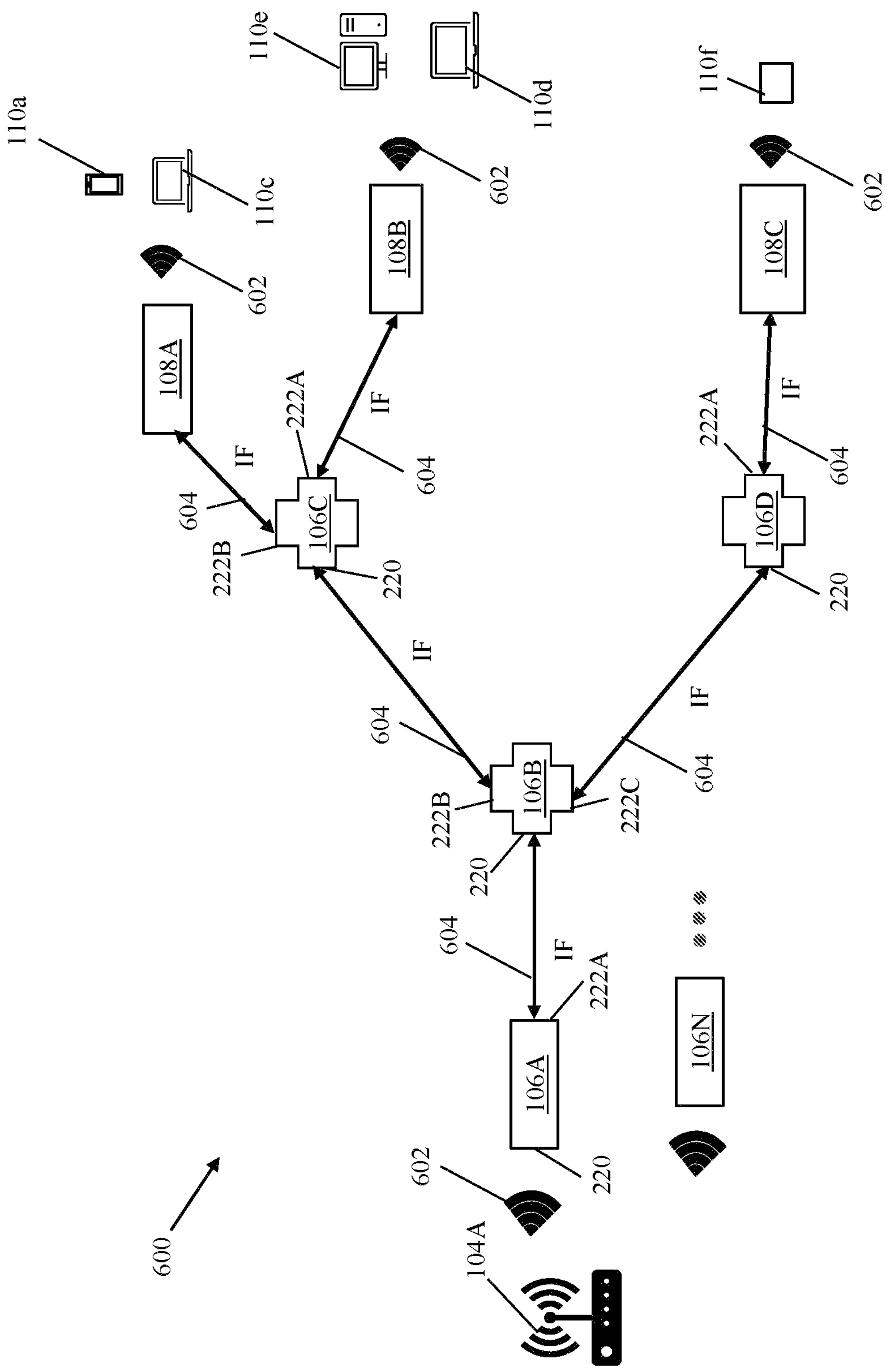
FIG. 6 is a diagram that illustrates an exemplary implementation of a wireless communication system for telemetry information-based signal interference detection and mitigation in a wireless backhaul mesh network for high-performance and ultra-reliable communication, in accordance with an exemplary embodiment of the disclosure.
Figure 7A:
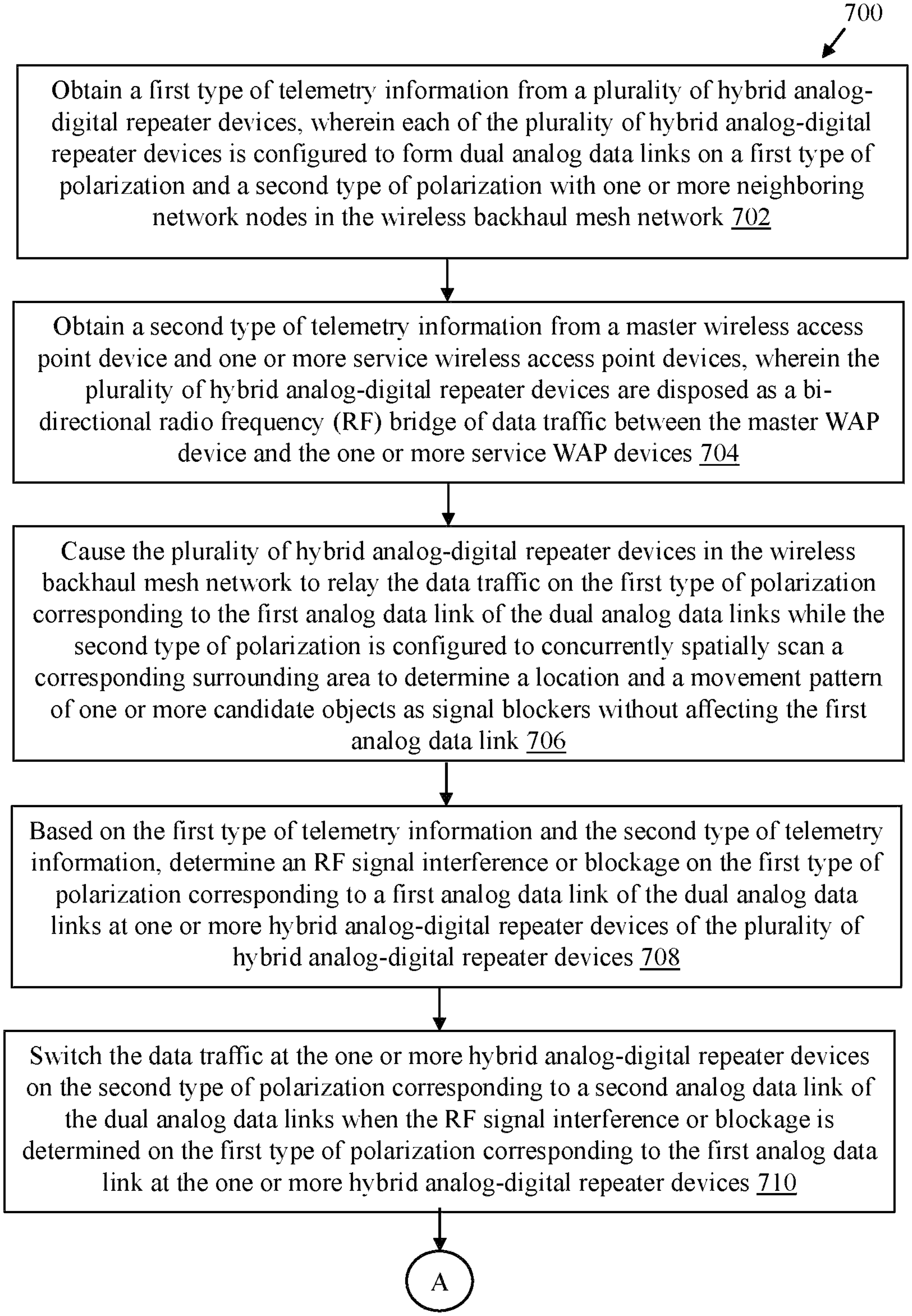
FIGS. 7A, 7B, 7C, and 7D, collectively, is a flowchart of a method for telemetry information-based signal interference detection and mitigation in a wireless backhaul mesh network for high-performance, low latency, and ultra-reliable communication, in accordance with an embodiment of the disclosure.
Figure 7B:
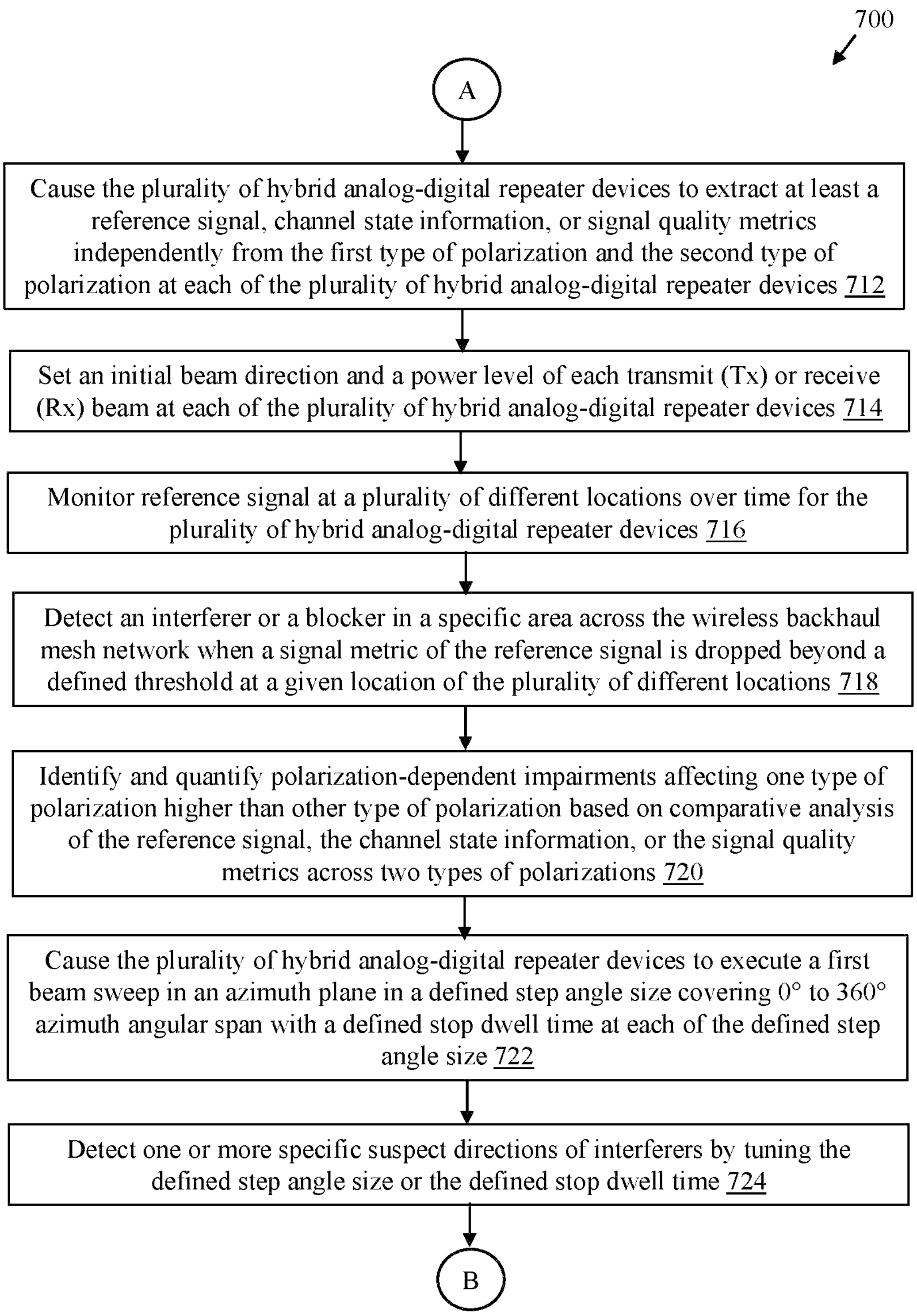
Figure 7C:
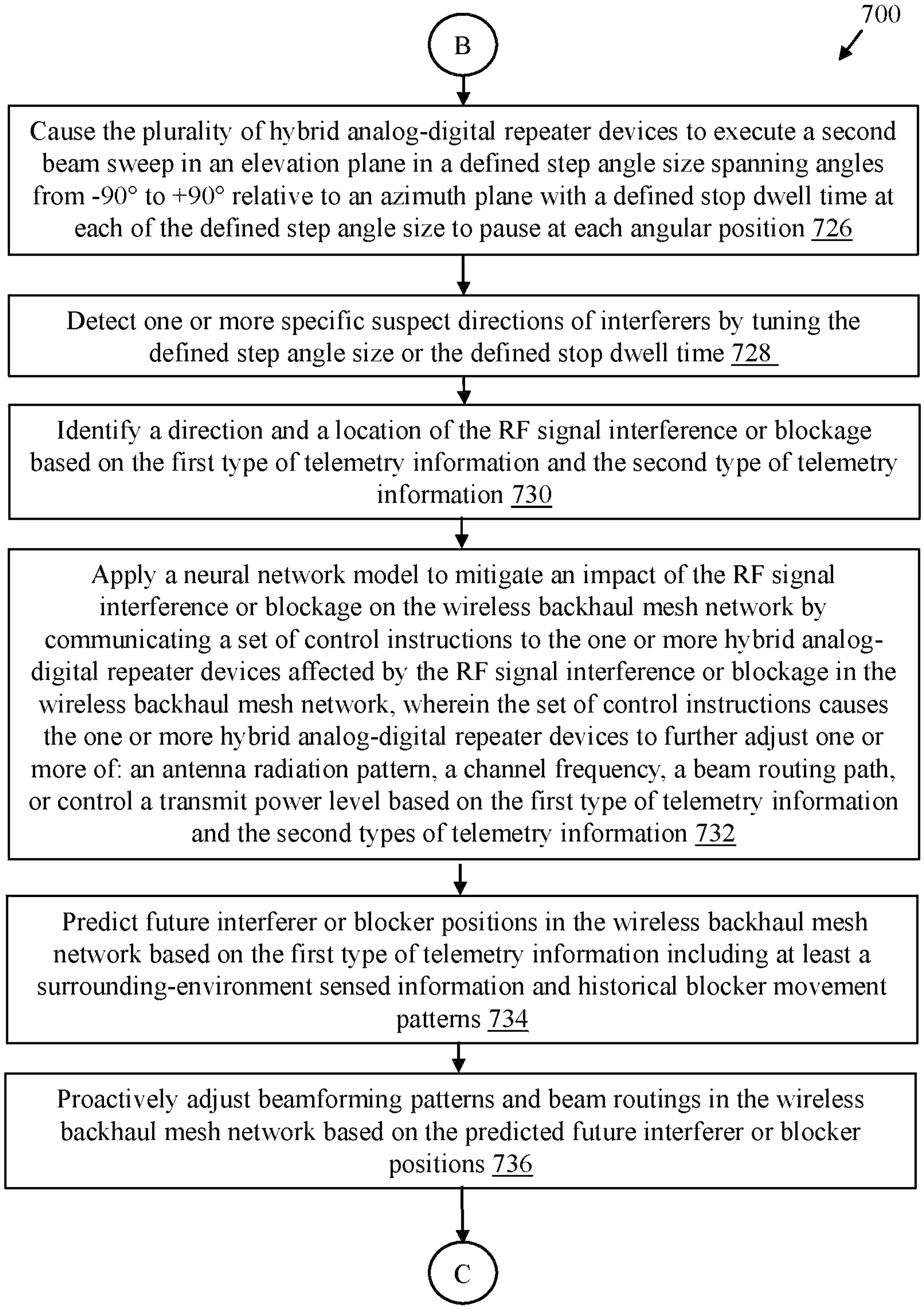
Figure 7D:
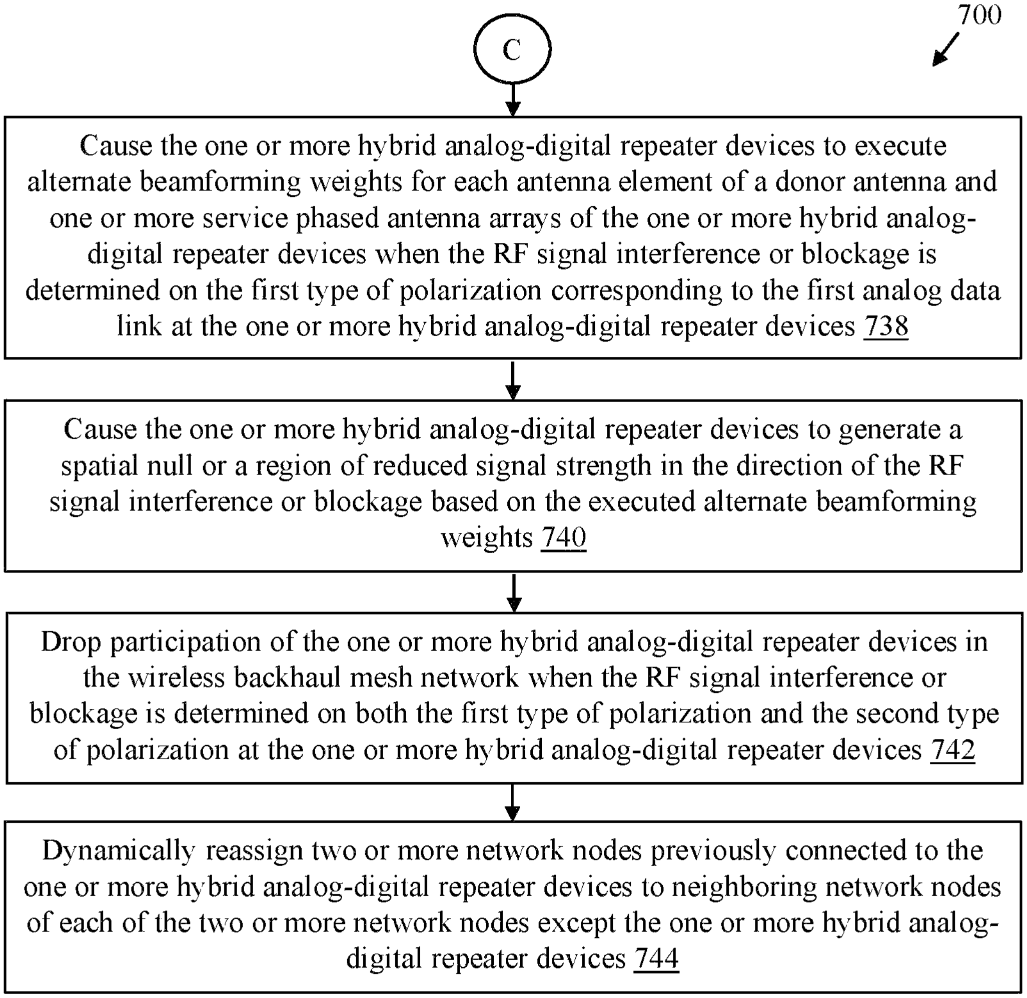

FIG. 6 is a diagram that illustrates an exemplary implementation of a wireless communication system for telemetry information-based signal interference detection and mitigation in a wireless backhaul mesh network for high-performance and ultra-reliable communication, in accordance with an exemplary embodiment of the disclosure. FIG. 6 is explained in conjunction with elements from FIGS. 1A, 1B, 1C, 2A, 2B, 3, 4, and 5. With reference to FIG. 6, there is shown an exemplary wireless communication system 600 that includes the master WAP device 104A, a wireless backhauls mesh network of the hybrid analog-digital repeater devices 106A, 106B, 106D, and 106N, and the service WAP devices 108A, 108B, and 108C.

In operation, the master WAP device 104A may be configured to communicate the second type of telemetry information 510 to the central cloud server 102. The central cloud server 102 may be configured to control the master WAP device 104A to communicate a WLAN signal 602 in a first WLAN frequency from the data source 112. In an implementation, the first WLAN frequency may be in a range of 6-9 GHz (e.g., Wi-Fi® 6, 7, 8). The master WAP device 104A may be at a first location. The plurality of hybrid analog-digital repeater devices 106 may be disposed at a plurality of different locations. Each of the plurality of hybrid analog-digital repeater devices 106 may be configured to communicate the first type of telemetry information 508 to the central cloud server 102. The hybrid analog-digital repeater device 106A may be configured to receive the WLAN signal 602 from the master WAP device 104A via the donor antenna 220 (which may be a WLAN antenna or a phase array antenna connected to a WLAN Fast Ethernet (FE) port. The hybrid analog-digital repeater device 106A may utilize the frequency converter 218 to convert the WLAN signal 602 to a beam of RF signals 604 in an intermediate frequency band (e.g., mmWave frequencies or other intermediate frequencies in the range of 10-300 GHz). The frequency converter 218 may perform frequency up conversion by frequency mixing of the WLAN signal 602 with a local oscillator signal, generating an intermediate frequency for improved wireless communication performance. The intermediate frequency band information may be communicated by the central cloud server 102 to the hybrid analog-digital repeater device 106A. The beam of RF signals 604 in the intermediate frequency band may be a mmWave frequency in a range of 10-300 GHz or other intermediate frequency in a range of 10-300 GHz. The intermediate frequency band of the first beam of RF signals 604 may be a licensed mmWave spectrum of a network operator or an unlicensed mmWave spectrum. The hybrid analog-digital repeater device 106A may be a root node that may then relay the beam of RF signals 604 in the intermediate frequency band on the first type of polarization 118A to one or more second hybrid analog-digital repeater devices (e.g., the hybrid analog-digital repeater devices 106B and 106N) of the plurality of hybrid analog-digital repeater devices 106.

In this case, the beam of RF signals 604 may be relayed to the hybrid analog-digital repeater device 106B based on routing instruction received from the central cloud server 102. The hybrid analog-digital repeater device 106B may be configured as a switch node that may receive the incoming beam of mmWave signal (i.e., the beam of RF signals 604) on the first type of polarization 118A via the donor antenna 220 from a first direction from the upstream node (i.e., the hybrid analog-digital repeater device 106A). In the switch node configuration, the donor antenna 220 may be implemented as a phase array antenna configured to receive a narrow beam, i.e., the beam of RF signals 604 via the donor antenna 220 and concurrently route the beam of RF signals 604 two or more downstream nodes in two or more different directions based on instruction and coordination from the central cloud server 102. In this case, the RF switch circuit 212 (of FIG. 2) may be configured to switch the beam of RF signals 604 to the two service phased antenna arrays 222B and 222C of the hybrid analog-digital repeater device 106B to concurrently route two parallel beams of RF signals 604 to two downstream nodes (e.g., the hybrid analog-digital repeater devices 106C and 106D) on the first type of polarization 118A in two different directions. The two service phased antenna arrays 222B and 222C may be arranged at different positions and orientations with respect to each other and with respect to the donor antenna 220. In other words, one or more of the plurality of hybrid analog-digital repeater devices 106 may be configured to concurrently route an incoming beam of RF signal in the intermediate frequency (e.g., mmWave signal) received from an upstream node in a first direction to two or more downstream nodes in two or more different directions under the control of the central cloud server 102. Each of the plurality of hybrid analog-digital repeater devices 106 may be equipped with the set of amplifiers 210 (e.g., power amplifiers) and the set of phase shifters 208, which enhances the mmWave signal and relays across the hybrid analog-digital repeater devices 106A, 106B, 106C, and 106D over longer distances.

The service WAP devices 108A may be configured to receive, via the phase array antenna 416, the first beam of RF signals 604 in the intermediate frequency band on the first type of polarization 118A from the service phased antenna array 222B of the hybrid analog-digital repeater devices 106C and convert the first beam of RF signals 604 back to the WLAN signal 602 in the first WLAN frequency (e.g., Wi-Fi® 6, 7, or 8, i.e., within 6-9 GHz frequency range) using the frequency converter 410 and based on control instruction (e.g., the set of intra-node RF beam parameters 522 received from the central cloud server 102). The frequency converter 410 may be used to down convert the first beam of RF signals 604 in the intermediate frequency band to the first WLAN frequency to serve to its connected UEs 110*a* and 110*c* in a data throughput greater than a threshold throughput, for example, in multi-gigabit data rate. Similarly, the service WAP devices 108B may be configured to receive the first beam of RF signals 604 in the intermediate frequency band from the service phased antenna array 222A of the hybrid analog-digital repeater devices 106C and convert the first beam of RF signals 604 back to the WLAN signal 602 in the first WLAN frequency (e.g., Wi-Fi® 6, 7, or 8, i.e., within 6-9 GHz frequency range) to serve to its connected UEs 110*d* and 110*e*. The service WAP devices 108C may be configured to receive the first beam of RF signals 604 in the intermediate frequency band on the first type of polarization 118A from the service phased antenna array 222A of the hybrid analog-digital repeater devices 106D and convert the first beam of RF signals 604 back to the WLAN signal 602 in the first WLAN frequency (e.g., Wi-Fi® 6, 7, or 8, i.e., within 6-9 GHz frequency range) to serve to its connected UE 110*f* (e.g., a client device, smart TV, or a CPE) based on the set of intra-node RF beam parameters 522 received from the central cloud server 102. The hybrid analog-digital repeater devices 106A to 106D extends the coverage area of the master WAP device 104A and the one or more service WAP devices 108, with a negligible latency even though user data passes through multiple hops. The hybrid analog-digital repeater devices 106A to 106D may be disposed as a bidirectional radio frequency (RF) bridge of data traffic between the master WAP device 104A and the service WAP devices 108A, 108B, and 108C such that a data propagation path of user data relayed through a network of the hybrid analog-digital repeater devices 106A to 106D may be analog without any digital decoding or encoding of the user data in the first beam of RF signals 604 to reduce latency less than a threshold time, in the order of nanoseconds. Further, a backchannel connectivity and control of the network of the hybrid analog-digital repeater devices 106A to 106D may be via a second WLAN frequency (e.g., 2.4 GHz or 5 GHz) frequency. The backchannel connectivity and control of the network of the hybrid analog-digital repeater devices 106A to 106D may be based on the signal metadata 206A of the first beam of RF signals 604. The second WLAN frequency may be less than the first WLAN frequency. In the upstream communication 116, the service WAP devices 108A, 108B, and 108C may be configured to acquire RF signals from its corresponding UEs and pack the user data back to the master WAP device 104A via the hybrid analog-digital repeater devices 106A to 106D on the first type of polarization 118A. In certain scenarios, based on the first type of telemetry information 508 and the second type of telemetry information 510, the central cloud server 102 maybe further configured to determine an RF signal interference or blockage on the first type of polarization 118A corresponding to a first analog data link at one or more hybrid analog-digital repeater devices, such as the hybrid analog-digital repeater device 106B. The central cloud server 102 maybe further configured to dynamically switch the data traffic at the one or more hybrid analog-digital repeater devices, such as the hybrid analog-digital repeater device 106B, on the second type of polarization 120A corresponding to a second analog data link when the RF signal interference or blockage is determined on the first type of polarization 118A corresponding to the first analog data link at the one or more hybrid analog-digital repeater devices. By leveraging the first type of telemetry information 508 and the second type of telemetry information 510, the central cloud server 102 enables intelligent switching mechanism to optimize network performance and wireless backhaul optimization and resilience to accelerate 5G or 6G adoption.

FIGS. 7A, 7B, 7C, and 7D, collectively, is a flowchart of a method for telemetry information-based signal interference detection and mitigation in a wireless backhaul mesh network for high-performance, low latency, and ultra-reliable communication, in accordance with an embodiment of the disclosure. FIGS. 7A to 7D are explained in conjunction with elements from FIGS. 1A, 1B, 1C, 2A, 2B 3, 4, and 5. With reference to 7A, 7B, 7C, and 7D, there is shown a flowchart of a method 700 comprising exemplary operations 702 through 734. The method 700 may be implemented in the central cloud server 102 of the wireless communication system 100A, 100C, or 600.

At 702, the first type of telemetry information 508 may be obtained from the plurality of hybrid analog-digital repeater devices 106. Each of the plurality of hybrid analog-digital repeater devices 106 may be configured to form the dual analog data links 118 and 120 on the first type of polarization 118A and the second type of polarization 120A with one or more neighboring network nodes in the wireless backhaul mesh network (described in detail, for example, in the FIGS. 1B and 5).

At 704, the second type of telemetry information 510 may be obtained from the master WAP device 104A and the one or more service WAP devices 108, where the plurality of hybrid analog-digital repeater devices 106 may be disposed as a bi-directional radio frequency (RF) bridge of data traffic between the master WAP device 104A and the one or more service WAP devices 108. In an implementation, a different weightage may be assigned to the first type of telemetry information 508 obtained from the plurality of hybrid analog-digital repeater devices 106 with respect to the second type of telemetry information 510 obtained from the master WAP device 104A and the one or more service WAP devices 108 in determination of an RF signal interference or blockage on different types of polarizations. The plurality of hybrid analog-digital repeater devices 106 may be caused to dynamically form a wireless backhaul mesh network among the master WAP device 104A, the plurality of hybrid analog-digital repeater devices 106 and the one or more service WAP devices 108, based on the determined one or more intra-node RF beam parameters (e.g., the set of intra-node RF beam parameters 522) and the one or more inter-node RF beam parameters (e.g., the set of inter-node RF beam parameters 524).

At 706, the plurality of hybrid analog-digital repeater devices 106 in the wireless backhaul mesh network maybe caused to relay the data traffic on the first type of polarization 118A corresponding to the first analog data link 118 of the dual analog data links 118 and 120 while the second type of polarization 120A may be configured to concurrently spatially scan a corresponding surrounding area to determine a location and a movement pattern of one or more candidate objects as signal blockers without affecting the first analog data link 118.

At 708, based on the first type of telemetry information 508 and the second type of telemetry information 510, an RF signal interference or blockage may be determined on the first type of polarization 118A corresponding to the first analog data link 118 of the dual analog data links 118 and 120 at one or more hybrid analog-digital repeater devices (e.g., the hybrid analog-digital repeater device 106B) of the plurality of hybrid analog-digital repeater devices 106.

At 710, the data traffic at the one or more hybrid analog-digital repeater devices may be switched on the second type of polarization 120A corresponding to the second analog data link 120 of the dual analog data links 118 and 120 when the RF signal interference or blockage is determined on the first type of polarization 118A corresponding to the first analog data link 118 at the one or more hybrid analog-digital repeater devices.

At 712, the plurality of hybrid analog-digital repeater devices 106 may be caused to extract at least a reference signal, channel state information, or signal quality metrics independently from the first type of polarization 118A and the second type of polarization 120A at each of the plurality of hybrid analog-digital repeater devices 106.

At 714, an initial beam direction and a power level of each transmit (Tx) or receive (Rx) beam may be set at each of the plurality of hybrid analog-digital repeater devices 106.

At 716, a reference signal may be monitored at a plurality of different locations over time for the plurality of hybrid analog-digital repeater devices 106.

At 718, an interferer or a blocker may be detected in a specific area across the wireless backhaul mesh network when a signal metric of the reference signal is dropped beyond a defined threshold at a given location of the plurality of different locations.

At 720, polarization-dependent impairments affecting one type of polarization higher than other type of polarization may be identified and quantified based on comparative analysis of the reference signal, the channel state information, or the signal quality metrics across two types of polarizations.

At 722, the plurality of hybrid analog-digital repeater devices 106 may be caused to execute a first beam sweep in an azimuth plane in a defined step angle size covering 0° to 360° azimuth angular span with a defined stop dwell time at each of the defined step angle size.

At 724, one or more specific suspect directions of interferers may be detected by tuning the defined step angle size or the defined stop dwell time.

At 726, the plurality of hybrid analog-digital repeater devices 106 may be caused to execute a second beam sweep in an elevation plane in a defined step angle size spanning angles from −90° to +90° relative to an azimuth plane with a defined stop dwell time at each of the defined step angle size to pause at each angular position.

At 728, one or more specific suspect directions of interferers may be detected by tuning the defined step angle size or the defined stop dwell time.

At 730, a direction and a location of the RF signal interference or blockage maybe identified based on the first type of telemetry information 508 and the second type of telemetry information 510.

At 732, the neural network model 102B may be applied (i.e., executed) to mitigate an impact of the RF signal interference or blockage on the wireless backhaul mesh network by communicating a set of control instructions to the one or more hybrid analog-digital repeater devices affected by the RF signal interference or blockage in the wireless backhaul mesh network. The set of control instructions may cause the one or more hybrid analog-digital repeater devices to further adjust one or more of an antenna radiation pattern, a channel frequency, a beam routing path, or control a transmit power level based on the first type of telemetry information 508 and the second types of telemetry information 510.

At 734, future blocker positions in the wireless backhaul mesh network may be predicted based on the first type of telemetry information 508 including at least a surrounding-environment sensed information and historical blocker movement patterns.

At 736, beamforming patterns and beam routings in the wireless backhaul mesh network may be proactively adjusted based on the predicted future blocker positions.

At 738, the one or more hybrid analog-digital repeater devices may be caused to execute alternate beamforming weights 512 for each antenna element of the donor antenna 220 and one or more service phased antenna arrays 222A, 222B, and 222C of the one or more hybrid analog-digital repeater devices when the RF signal interference or blockage is determined on the first type of polarization 118A corresponding to the first analog data link 118 at the one or more hybrid analog-digital repeater devices.

At 740, a spatial null or a region of reduced signal strength may be generated in the direction of the RF signal interference or blockage based on the executed alternate beamforming weights 512.

At 742, participation of the one or more hybrid analog-digital repeater devices in the wireless backhaul mesh network may be dropped when the RF signal interference or blockage is determined on both the first type of polarization 118A and the second type of polarization 120A at the one or more hybrid analog-digital repeater devices.

At 744, two or more network nodes previously connected to the one or more hybrid analog-digital repeater devices may be dynamically reassigned to neighboring network nodes of each of the two or more network nodes except the one or more hybrid analog-digital repeater devices.

Various embodiments of the disclosure may provide the wireless communication system 100A, 100C or 600 (FIG. 1A, 1C, or 6). The wireless communication system 100A, 100C or 600 includes the central cloud server 102 configured to obtain the first type of telemetry information 508 from the plurality of hybrid analog-digital repeater devices 106, wherein each of the plurality of hybrid analog-digital repeater devices 106 may be configured to form the dual analog data links 118 and 120 on a first type of polarization 118A and a second type of polarization 120A with one or more neighboring network nodes in the wireless backhaul mesh network. The central cloud server 102 maybe further configured to obtain the second type of telemetry information 510 from the master WAP device 104A and one or more service WAP devices 108 in the wireless backhaul mesh network, wherein the plurality of hybrid analog-digital repeater devices 106 may be disposed as a bi-directional radio frequency (RF) bridge of data traffic between the master WAP device 104A and the one or more service WAP devices 108. Based on the first type of telemetry information 508 and the second type of telemetry information 510, the central cloud server 102 maybe further configured to determine an RF signal interference or blockage on the first type of polarization 118A corresponding to a first analog data link 118 of the dual analog data links 118 and 120 at one or more hybrid analog-digital repeater devices of the plurality of hybrid analog-digital repeater devices 106. The central cloud server 102 maybe further configured to switch the data traffic at the one or more hybrid analog-digital repeater devices on the second type of polarization 120A corresponding to a second analog data link 120 of the dual analog data links 118 and 120 when the RF signal interference or blockage is determined on the first type of polarization 118A corresponding to the first analog data link 118 at the one or more hybrid analog-digital repeater devices.

Various embodiments of the disclosure may provide a computer program product for wireless communication, the computer program product comprising a computer-readable storage medium (e.g., a non-transitory computer-readable storage medium) having program instructions embodied therewith, the program instructions are executable by a system to cause the system to execute operations, the operations comprising obtaining the first type of telemetry information 508 from the plurality of hybrid analog-digital repeater devices 106 in a wireless backhaul mesh network, wherein each of the plurality of hybrid analog-digital repeater devices 106 may be configured to form the dual analog data links 118 and 120 on a first type of polarization 118A and a second type of polarization 120A with one or more neighboring network nodes in the wireless backhaul mesh network. The operations further comprise obtaining the second type of telemetry information 510 from the master WAP device 104A and one or more service WAP devices 108 in the wireless backhaul mesh network, wherein the plurality of hybrid analog-digital repeater devices 106 may be disposed as a bi-directional radio frequency (RF) bridge of data traffic between the master WAP device 104A and the one or more service WAP devices 108. The operations further comprise, based on the first type of telemetry information 508 and the second type of telemetry information 510, determining an RF signal interference or blockage on the first type of polarization 118A corresponding to a first analog data link 118 of the dual analog data links 118 and 120 at one or more hybrid analog-digital repeater devices of the plurality of hybrid analog-digital repeater devices 106. The operations further comprise switching the data traffic at the one or more hybrid analog-digital repeater devices on the second type of polarization 120A corresponding to a second analog data link 120 of the dual analog data links 118 and 120 when the RF signal interference or blockage is determined on the first type of polarization 118A corresponding to the first analog data link 118 at the one or more hybrid analog-digital repeater devices.

While various embodiments described in the present disclosure have been described above, it should be understood that they have been presented by way of example, and not limitation. It is to be understood that various changes in form and detail can be made therein without departing from the spirit and scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in computer-readable storage medium such as a non-transitory computer-readable medium configured to store the software. Such software can enable, for example, the function, fabrication, modeling, simulation, description and/or testing of the apparatus and methods described herein. For example, this can be accomplished using general program languages (e.g., C, C++), hardware description languages (HDL) including Verilog HDL, VHDL, and so on, or other available programs. Such software can be disposed of in any known computer-readable storage medium such as non-transitory computer-readable medium, such as semiconductor, magnetic disc, or optical disc (e.g., CD-ROM, DVD-ROM, etc.). The software can also be disposed as computer data embodied in a computer-readable storage medium such as non-transitory computer-readable transmission medium (e.g., solid state memory any other non-transitory medium including digital, optical, analog-based medium, such as removable storage media). Embodiments of the present disclosure may include methods of providing the apparatus described herein by providing software describing the apparatus and subsequently transmitting the software as a computer data signal over a communication network including the Internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments but should be defined only in accordance with the following claims and their equivalents.

Various aspects of the present disclosure are described by narrative text, flowcharts, diagrams of computer systems and/or diagrams of the machine logic included in various computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

What is claimed is:

1. A wireless communication system, comprising:
a central cloud server configured to:
cause a plurality of hybrid analog-digital repeater devices in a wireless backhaul mesh network to execute a first beam sweep in an azimuth plane in a first defined step angle size covering 0° to 360° azimuth angular span with a first defined stop dwell time at each of the first defined step angle size;
detect one or more first specific suspect directions of interferers by tuning the first defined step angle size or the first defined stop dwell time;
cause the plurality of hybrid analog-digital repeater devices to execute a second beam sweep in an elevation plane in a second defined step angle size spanning angles from −90° to +90° relative to the azimuth plane with a second defined stop dwell time at each of the second defined step angle size to pause at each angular position; and
detect one or more second specific suspect directions of the interferers by tuning the second defined step angle size or the second defined stop dwell time.

2. The wireless communication system of claim 1, wherein the central cloud server is further configured to:
obtain a first type of telemetry information from the plurality of hybrid analog-digital repeater devices in the wireless backhaul mesh network, wherein
each of the plurality of hybrid analog-digital repeater devices is configured to form dual analog data links on a first type of polarization and a second type of polarization with one or more neighboring network nodes in the wireless backhaul mesh network, and
the first type of polarization is different from the second type of polarization;
obtain a second type of telemetry information from a master wireless access point (WAP) device and one or more service WAP devices in the wireless backhaul mesh network; and
determine, based on the first type of telemetry information and the second type of telemetry information, a radio frequency (RF) signal interference or blockage on the first type of polarization corresponding to a first analog data link of the dual analog data links at one or more hybrid analog-digital repeater devices of the plurality of hybrid analog-digital repeater devices.

3. The wireless communication system of claim 2, wherein
the plurality of hybrid analog-digital repeater devices is disposed as a bi-directional RF bridge of data traffic between the master WAP device and the one or more service WAP devices,
the central cloud server is further configured to:
cause the plurality of hybrid analog-digital repeater devices in the wireless backhaul mesh network to relay the data traffic on the first type of polarization corresponding to the first analog data link of the dual analog data links while the second type of polarization is configured to concurrently spatially scan a corresponding surrounding area to determine a location and a movement pattern of one or more candidate objects as signal blockers without affecting the first analog data link; and
switch the data traffic at the one or more hybrid analog-digital repeater devices on the second type of polarization corresponding to a second analog data link of the dual analog data links in a case where the RF signal interference or blockage is determined on the first type of polarization corresponding to the first analog data link at the one or more hybrid analog-digital repeater devices.

4. The wireless communication system of claim 2, wherein the central cloud server is further configured to identify a direction and a location of the RF signal interference or blockage based on the first type of telemetry information and the second type of telemetry information.

5. The wireless communication system of claim 3, wherein the central cloud server is further configured to apply a neural network model to mitigate an impact of the RF signal interference or blockage on the wireless backhaul mesh network by communicating a set of control instructions to the one or more hybrid analog-digital repeater devices affected by the RF signal interference or blockage in the wireless backhaul mesh network, and
wherein the set of control instructions causes the one or more hybrid analog-digital repeater devices to further adjust one or more of: an antenna radiation pattern, a channel frequency, a beam routing path, or control a transmit power level based on the first type of telemetry information and the second type of telemetry information.

6. The wireless communication system of claim 2, wherein the central cloud server is further configured to:
predict future blocker positions in the wireless backhaul mesh network based on the first type of telemetry information including at least a surrounding-environment sensed information and historical blocker movement patterns; and
proactively adjust beamforming patterns and beam routings in the wireless backhaul mesh network based on the predicted future blocker positions.

7. The wireless communication system of claim 2, wherein the central cloud server is further configured to cause the one or more hybrid analog-digital repeater devices to:
execute alternate beamforming weights for each antenna element of a donor antenna and one or more service phased antenna arrays of the one or more hybrid analog-digital repeater devices in a case where the RF signal interference or blockage is determined on the first type of polarization corresponding to the first analog data link at the one or more hybrid analog-digital repeater devices; and generate a spatial null or a region of reduced signal strength in a direction of the RF signal interference or blockage based on the executed alternate beamforming weights.

8. The wireless communication system of claim 1, wherein the central cloud server is further configured to cause the plurality of hybrid analog-digital repeater devices to extract at least a reference signal, channel state information, or signal quality metrics independently from a first type of polarization and a second type of polarization at each of the plurality of hybrid analog-digital repeater devices.

9. The wireless communication system of claim 8, wherein the central cloud server is further configured to identify and quantify polarization-dependent impairments affecting one type of polarization higher than other type of polarization based on comparative analysis of the reference signal, the channel state information, or the signal quality metrics across two types of polarizations.

10. The wireless communication system of claim 1, wherein the central cloud server is further configured to set an initial beam direction and a power level of each transmit (Tx) or receive (Rx) beam at each of the plurality of hybrid analog-digital repeater devices.

11. The wireless communication system of claim 10, wherein the central cloud server is further configured to monitor a reference signal at a plurality of different locations over time for the plurality of hybrid analog-digital repeater devices.

12. The wireless communication system of claim 11, wherein the central cloud server is further configured to detect an interferer or a blocker in a specific area across the wireless backhaul mesh network when a signal metric of the reference signal is dropped beyond a defined threshold at a given location of the plurality of different locations.

13. The wireless communication system of claim 2, wherein the first type of telemetry information obtained from the plurality of hybrid analog-digital repeater devices comprises two or more of: a unique identifier (ID) of each of the plurality of hybrid analog-digital repeater devices, a geo-location of each of the plurality of hybrid analog-digital repeater devices, an operational state of the plurality of hybrid analog-digital repeater devices, signal metadata of an incoming beam of RF signals at each of the plurality of hybrid analog-digital repeater devices, vibration information indicative of a change in vibration detected at each of the plurality of hybrid analog-digital repeater devices, antenna array orientation change information indicative of a change in an orientation of a donor antenna and one or more service phased antenna arrays of each of the plurality of hybrid analog-digital repeater devices, and surrounding-environment sensed information sensed by a set of onboard sensors at each of the plurality of hybrid analog-digital repeater devices.

14. The wireless communication system of claim 2, wherein the second type of telemetry information obtained from the master WAP device and the one or more service WAP devices comprises user equipment (UE) related information of one or more UEs wirelessly connected to a corresponding wireless access point pertaining to the master WAP device and the one or more service WAP devices, and wherein the UE related information comprises a Received Signal Strength Indicator (RSSI), a throughput, a latency, a packet loss measurement, a channel utilization, an interference level, a retransmission or error rate, device information, and location data associated with each UE of the one or more UEs connected to the corresponding wireless access point.

15. The wireless communication system of claim 2, wherein the central cloud server is further configured to drop participation of the one or more hybrid analog-digital repeater devices in the wireless backhaul mesh network in a case where the RF signal interference or blockage is determined on both the first type of polarization and the second type of polarization at the one or more hybrid analog-digital repeater devices.

16. The wireless communication system of claim 14, wherein the central cloud server is further configured to dynamically reassign two or more network nodes previously connected to the one or more hybrid analog-digital repeater devices to neighboring network nodes of each of the two or more network nodes except the one or more hybrid analog-digital repeater devices.

17. A method for telemetry information-based signal interference mitigation in a wireless backhaul mesh network, the method comprising:

in a central cloud server:

causing a plurality of hybrid analog-digital repeater devices in the wireless backhaul mesh network to execute a first beam sweep in an azimuth plane in a first defined step angle size covering 0° to 360° azimuth angular span with a first defined stop dwell time at each of the first defined step angle size;

detecting one or more first specific suspect directions of interferers by tuning the first defined step angle size or the first defined stop dwell time;

causing the plurality of hybrid analog-digital repeater devices to execute a second beam sweep in an elevation plane in a second defined step angle size spanning angles from −90° to +90° relative to the azimuth plane with a second defined stop dwell time at each of the second defined step angle size to pause at each angular position; and detecting one or more second specific suspect directions of the interferers by tuning the second defined step angle size or the second defined stop dwell time.

18. The method of claim 17, further comprising:

causing the plurality of hybrid analog-digital repeater devices to extract at least a reference signal, channel state information, or signal quality metrics independently from a first type of polarization and a second type of polarization at each of the plurality of hybrid analog-digital repeater devices, wherein the plurality of hybrid analog-digital repeater devices are disposed as a bi-directional radio frequency (RF) bridge of data traffic between a master wireless access point (WAP) device and one or more service WAP devices;

identifying and quantifying polarization-dependent impairments affecting one type of polarization higher than other type of polarization based on comparative analysis of the reference signal, the channel state information, or the signal quality metrics across two types of polarizations; and switching the data traffic at one or more hybrid analog-digital repeater devices on the second type of polarization corresponding to a second analog data link of dual analog data links in a case where a radio frequency (RF) signal interference or blockage is determined on the first type of polarization corresponding to a first analog data link at the one or more hybrid analog-digital repeater devices.

19. The method of claim 18, further comprising detecting an interferer or a blocker in a specific area across the wireless backhaul mesh network when a signal metric of the reference signal is dropped beyond a defined threshold at a given location of a plurality of different locations.

20. A computer program product for telemetry information-based signal interference mitigation in a wireless backhaul mesh network, the computer program product comprising a computer-readable storage medium having program instructions embodied therewith, the program instructions are executable by a system to cause the system to execute operations, the operations comprising:

causing a plurality of hybrid analog-digital repeater devices in the wireless backhaul mesh network to execute a first beam sweep in an azimuth plane in a first defined step angle size covering 0° to 360° azimuth angular span with a first defined stop dwell time at each of the first defined step angle size;

detecting one or more first specific suspect directions of interferers by tuning the first defined step angle size or the first defined stop dwell time;

causing the plurality of hybrid analog-digital repeater devices to execute a second beam sweep in an elevation plane in a second defined step angle size spanning angles from −90° to +90° relative to the azimuth plane with a second defined stop dwell time at each of the second defined step angle size to pause at each angular position; and detecting one or more second specific suspect directions of the interferers by tuning the second defined step angle size or the second defined stop dwell time.

* * * * *